US011455832B2

United States Patent
Hassan et al.

(10) Patent No.: US 11,455,832 B2
(45) Date of Patent: Sep. 27, 2022

(54) FACE RECOGNITION IN NOISY ENVIRONMENTS

(71) Applicant: Microsoft Technology Licensing, LLC, Redmond, WA (US)

(72) Inventors: Amer Aref Hassan, Kirkland, WA (US); Carlos A. Perez Nafarrate, Bothell, WA (US); Edward C. Giaimo, III, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 17/085,265

(22) Filed: Oct. 30, 2020

(65) Prior Publication Data

US 2021/0073520 A1    Mar. 11, 2021

Related U.S. Application Data

(63) Continuation of application No. 16/191,079, filed on Nov. 14, 2018, now Pat. No. 10,853,628.

(51) Int. Cl.
 *G06V 40/16*    (2022.01)

(52) U.S. Cl.
 CPC .......... *G06V 40/172* (2022.01); *G06V 40/161* (2022.01)

(58) Field of Classification Search
 CPC ........ G06F 21/32; G07C 9/37; G06V 40/172; G06V 40/1365; G06V 40/161
 See application file for complete search history.

(56) References Cited

U.S. PATENT DOCUMENTS

| | | | |
|---|---|---|---|
| 11,113,510 B1 * | 9/2021 | Mostafa | G06V 40/172 |
| 2006/0288234 A1 * | 12/2006 | Azar | G06V 40/172 713/186 |
| 2019/0188448 A1 * | 6/2019 | Kim | G06V 10/30 |

* cited by examiner

*Primary Examiner* — Edward F Urban
*Assistant Examiner* — Wassim Mahrouka
(74) *Attorney, Agent, or Firm* — Schwegman Lundberg & Woessner, P.A.

(57) ABSTRACT

A computing device stores a captured image as a transient image template when there is a failure in an image-based authentication of the captured image and the user of the computing device has provided user credentials that authorize the user to access the computing device. The transient image template may be used to further authorize the user to access the computing device during an established time period.

20 Claims, 15 Drawing Sheets

FACE RECOGNITION IN NOISY ENVIRONMENTS

CROSS-REFERENCE TO RELATED APPLICATION

This application is a continuation application of, and claims the benefit of priority to, U.S. patent application Ser. No. 16/191,079, titled "FACE RECOGNITION IN NOISE ENVIRONMENTS" and filed Nov. 14, 2018, the disclosure of which is hereby incorporated by reference in its entirety.

TECHNICAL FIELD

The subject matter disclosed herein generally relates to an image-based authentication mechanism and, in particular, to using a transient image template for performing image-based authentication where the time period for using the trainset image template incrementally increases when various conditions are met.

BACKGROUND

A computing device typically employs one or more mechanisms for authenticating a user to use the computing device. Examples of such mechanisms include a Personal Identification Number (e.g., a PIN), an alphanumeric password, a biometric input (e.g., voice, fingerprint, etc.), and image recognition. Image recognition is often used over an alphanumeric password or PIN because the user is not required to memorize the alphanumeric password or PIN and can simply have the computing device capture an image of him or her to access the computing device. Image recognition also provides a hands-free and voice-free method by which a user may authenticate himself or herself to the computing device. Images recognized may include a face, iris, cornea, or other body part.

In general, the computing device uses a baseline image template for performing the image recognition. The computing device may use one or more image processing techniques to compare the baseline image template with a captured image of the user attempting to authenticate himself or herself with the computing device. Where the computing device determines that the captured image is similar to the baseline image template, the computing device may then authorize the user to access the computing device.

However, under some conditions, the computing device may determine that the captured image is not similar to the baseline image template, even where the user is, in fact, authorized to access the computing device. As one example, varying lighting conditions may affect the captured image such that the computing device has difficulty determining whether the captured image is similar to the baseline image template. Further still, the varying lighting conditions may persist such that the image recognition mechanism becomes a less accurate or less useful means by which to authenticate the user.

SUMMARY

To address these and other problems that arise within the field of image-based authentication, this disclosure provides for one or more embodiments of a computing device that establishes a temporary or transient image template for use in authenticating a user when the computing device is unable to authenticate a user using a captured image.

In one embodiment, a method for authenticating users using image recognition in noisy environments using at least one hardware processor includes identifying a failed authentication attempt for a user, the failed authentication attempt identified in response to a comparison between a captured image of the user and a first image template; identifying a successful authentication attempt for the user, the successful authentication attempt occurring subsequent to the failed authentication attempt and using a credential of the user; in response to the successful authentication attempt, generating a second image template different than the first image template using the captured image, wherein the second image template is generated in response to identifying that the captured image meets a quality metric indicative of environmental conditions different than environment conditions for an image of the user obtained to generate the first image template; in response to generating the second image template, establishing an expiration time of a timer; subsequent to establishing the expiration time of the timer and prior to the timer reaching the expiration time, receiving a new authentication request for the user; and in response to identifying that the new authentication request occurred prior to the timer reaching the expiration time, using the second image template to authenticate the user.

In another embodiment, a system for authenticating users using image recognition in noisy environments includes one or more hardware processors and one or more memories, storing instructions, which when executed, cause the one or more hardware processors to perform operations including identifying a failed authentication attempt for a user, the failed authentication attempt identified in response to a comparison between a captured image of the user and a first image template; identifying a successful authentication attempt for the user, the successful authentication attempt occurring subsequent to the failed authentication attempt and using a credential of the user; in response to the successful authentication attempt, generating a second image template different than the first image template using the captured image, wherein the second image template is generated in response to identifying that the captured image meets a quality metric indicative of environmental conditions different than environment conditions for an image of the user obtained to generate the first image template; in response to generating the second image template, establishing an expiration time of a timer; subsequent to establishing the expiration time of the timer and prior to the timer reaching the expiration time, receiving a new authentication request for the user; and in response to identifying that the new authentication request occurred prior to the timer reaching the expiration time, using the second image template to authenticate the user.

In another embodiment, a system for authenticating users using image recognition in noisy environments includes means for identifying a failed authentication attempt for a user, the failed authentication attempt identified in response to a comparison between a captured image of the user and a first image template; means for identifying a successful authentication attempt for the user, the successful authentication attempt occurring subsequent to the failed authentication attempt and using a credential of the user; means for generating a second image template different than the first image template using the captured image in response to the successful authentication attempt, wherein the second image template is generated in response to identifying that the captured image meets a quality metric indicative of environmental conditions different than environment conditions for an image of the user obtained to generate the first image template means for establishing an expiration time of a timer in response to generating the second image template means for receiving a new authentication request for the user subsequent to establishing the expiration time of the timer and prior to the timer reaching the expiration time; and means for using the second image template to authenticate the user in response to identifying that the new authentication request occurred prior to the timer reaching the expiration time.

BRIEF DESCRIPTION OF THE DRAWINGS

Some embodiments are illustrated by way of example and not limitation in the figures of the accompanying drawings.

DETAILED DESCRIPTION

Figure 1:
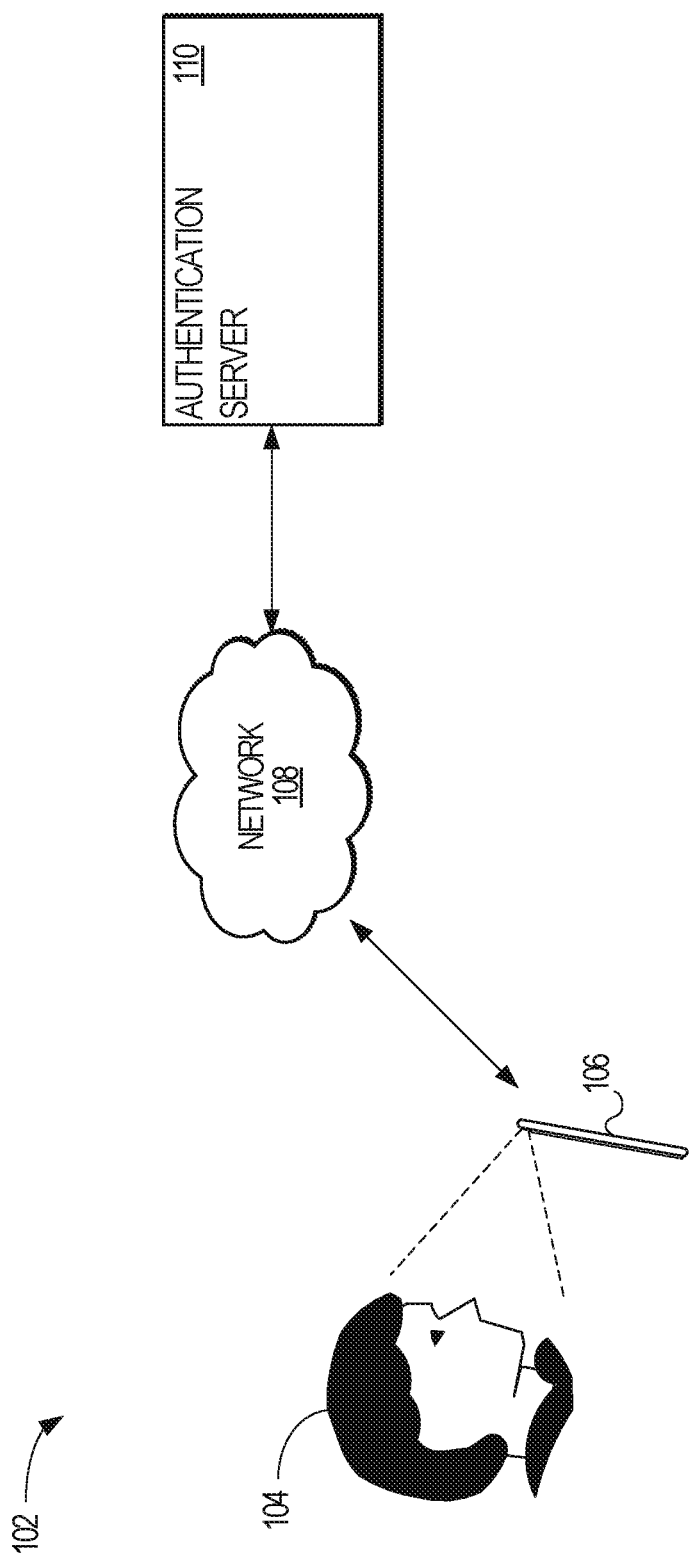
FIG. 1 is a block diagram illustrating a computing device in communication with an image processing server, according to an example embodiment, for authenticating a user using an image recognition technique.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

This disclosure provides systems and methods for performing image-based authentication of a user requesting access to a computing device. In one embodiment, the computing device captures an image of a user to authenticate the user, and compares the captured image with a baseline image template to determine whether the captured image corresponds to the baseline image template. Where the computing device determines that the captured image corresponds to the baseline image template, the computing device may authenticate the user. Where the computing device determines that the captured image does not correspond to the baseline image template, the computing device may first display a prompt or query requesting that the user authenticate himself or herself using a second authentication mechanism, such as a user-input PIN or pattern.

Where the second authentication mechanism is successful (e.g., the user has authenticated himself or herself), the computing device may then determine whether an adequate image has been acquired and/or captured. In this regard, the computing device may determine various quality metrics of the acquired image(s), such as an ambient light measurement (or the detected ambient light), and compare these determined quality metrics with one or more quality metric thresholds.

Where the computing device determines that one or more of the quality metrics of the acquired image(s) meet or exceed one or more of the quality metric thresholds, the computing device may store the captured image and use the captured image as a transient image template for future comparisons of captured images. In this regard, the presumption is that the computing device is being used in an environment where environment makes it challenging to acquire facial images of the user, and that the transient image template will be useful in authenticating the user based on images captured within the same environment.

The transient image template may be associated with a transient timer that indicates a time period or duration for the computing device to use the transient image template. In one embodiment, while the transient timer is active (e.g., has not expired), the computing device may be considered to be operating in a transient mode. During the transient mode, acquired image(s) used for image-based authentication may be compared with the transient image template. When the transient timer expires, the computing device may be considered to be in "normal" or "baseline" mode. Furthermore, the computing device may store a timestamp, or other time value, that indicates when the computing device exited the transient mode and entered the baseline mode. As discussed below, the computing device may use this timestamp to determine whether the computing device has recently exited transient mode. In this regard, the recentness of exiting the transient mode may be determined by computing a difference between a current time value and the timestamp value.

In one embodiment, the computing device compares the time difference value with a transient mode threshold value to determine whether the computing device recently exited the transient mode. Where the computing device affirmatively makes this determination, the computing device may increment the transient timer by a predetermined value and, where applicable, re-engage the transient mode. In addition, the computing device may convert an acquired image to a transient image template, and associate the increased transient timer with the transient image template.

Determining whether the computing device has recently exited transient mode and increasing the value of the transient timer accordingly has a number of technical benefits. First, the increased transient timer ensures that the computing device remains in the transient mode for a longer duration of time. This allows the computing device to automatically compare acquired image(s) with a corresponding transient image template. This automatic step saves on computing resources as the computing device automatically compares the acquired image(s) with the transient image template rather than performing additional determinations. In addition, the increased duration of the transient mode ensures that the user of the computing device need not authenticate himself or herself using secondary means of authentication where the comparison with the transient image template would suffice. In this regard, the user of the computing device is not pestered to continuously authenticate himself or herself using the secondary means of authentication where the transient image template should be used, leading to increase usage of the computing device and a better user experience. Finally, less authentication rejections are likely as the computing device remains in the transient mode, and the facial images acquired during this time are likely to be more comparable to the transient image template rather than the baseline image template.

Other technical improvements are also provided through the transient image templates. For example, the transient image template increases the likelihood that the user will be able to access his or her computing device in the event that a subsequently captured image exhibits similar qualities (e.g., poor lighting conditions, blurriness, portions being obscured, etc.) as the initial captured image on which the transient image template is based. However, as a security precaution, the computing device may delete, remove, or otherwise make unavailable, the transient image template after a predetermined time period has elapsed. The transient image template may be deleted from the computing device because, as the number of transient image templates increase, the overall security of the computing device decreases. Thus, in addition to the technical benefits to the field of image-based authentication, this disclosure also provides technical benefits to computer security and authentication as the deletion of the transient image template reduces the likelihood that an unauthorized user will gain access to the computing device using a captured image exhibiting similar lighting conditions as the transient image template.

Furthermore, and as discussed below with reference to FIGS. 6A-7B, the disclosure further provides variations on the above embodiments, such as by extending the embodiment to encompass locations and/or to associate increases of the transient timer with the associated locations. Thus, further technical improvements to the functioning of the computing device are disclosed.

This disclosure now turns to the various disclosed embodiments that implement the technical aspects described herein. FIG. 1 is a block diagram illustrating a computing device 106 in communication with an authentication server 110, according to an example embodiment, for authenticating a user 104 using an image recognition technique. In one embodiment, the computing device 106 is configured to authenticate the user 104 by capturing an image of the user 104 and comparing the captured image with an image template. In another embodiment, the computing device 106 is configured to authenticate the user 104 by capturing an image of the user 104, and communicating the captured image to the authentication server 110, which then performs the comparison of the captured image with the image template. The authentication server 110 then communicates the results of the comparison to the computing device 106.

The authentication server 110 provides server-side functionality via a network 108 (e.g., the Internet or wide area network (WAN)) to the computing device 106. The computing device 106, may include a client application and/or modules for interacting with the authentication server 110 and performing image-based authentication of the user 104. Examples of applications that may be instantiated by the computing device 106 include a web client, a single-purpose application (e.g., an "app"), a multi-purpose application (e.g., a programmatic client), or combinations thereof. The image processing server 106 may also be communicatively coupled with other computing devices (not shown) which may include similar applications and/or programs as the computing device 106.

The computing device 106 may comprise, but is not limited to, a mobile phone, desktop computer, laptop, portable digital assistant (PDA), smart phone, tablet, ultra book, netbook, laptop, multi-processor system, microprocessor-based or programmable consumer electronic, or any other communication device that the user 104 may utilize to perform various computing tasks (e.g., accessing the Internet, making a phone call, conducting a video conference, etc.). In some embodiments, the computing device 106 may comprise a display module (not shown) to display information (e.g., in the form of user interfaces). In further embodiments, the computing device 106 may comprise one or more of touch screens, accelerometers, gyroscopes, cameras, microphones, global positioning system (GPS) devices, and so forth. As discussed in more detail below with reference to FIG. 2, the computing device 106 uses its various sensors and hardware components to verify the identity of the user 104 and to store transient images of the user 104 based on various lighting conditions in which the user 104 has captured an image of himself or herself.

In one embodiment, the authentication server 110 is a network-based appliance that conducts bi-directional and/or unidirectional communications with the computing device 106. In some instances, multiple users have may corresponding user accounts verifiable by the computing device 106 (e.g., such as where the computing device 106 is a terminal to an enterprise network), and the multiple users may each request access to the computing device 106 at different times or, where the computing device 106 implements a multi-tasking operating system, at the same time. The one or more users may be a person, a machine, or other means of interacting with the computing device 106. In various embodiments, the user is not part of the networked system 102, but may interact with the networked system 102 via the computing device 106 or another means.

The computing device 106 may communicate with the authentication server 110 through one or more networks 108. Although the one or more networks 108 are illustrated as a single instance, one of ordinary skill in the art will appreciate that multiple networks and/or multiple types of networks may communicatively couple the computing device 106 with the authentication server 110. For example, one or more portions of the one or more networks 108 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi network, a WiMAX network, another type of network, or a combination of two or more such networks.

The computing device 106 may include one or more applications (also referred to as "apps") such as, but not limited to, a web browser, messaging application, electronic mail (email) application, a communication session application, and the like. In some embodiments, if the communication session application is stored on the computing device 106 as a native application, then this application is configured to locally provide the user interface and at least some of the functionalities used to communicate with the authentication server 110 (e.g., authenticate a user, establish a communication channel between one or more computing devices and/or services, display or output audio and/or video, capture audio and/or video using one or more input devices, etc.). Conversely if the communication session client is not stored on the computing device 106, the computing device 106 may use its web browser to access the services provided by the authentication server 110.

The user 104 may interact with the networked system 102 via the computing device 106 or other means. For instance, the user 104 provides input (e.g., touch screen input or alphanumeric input) to the computing device 106 and the input is communicated to the networked system 102 via the network 108. In this instance, the authentication server 110, in response to receiving the input from the user 104 or an instruction from the computing device 106, communicates information to the computing device 106 via the network 108 to be presented to the user 104. In this way, the computing device 106 facilitates interactions between the user 104 and the authentication server 110.

Further, while the networked system 102 shown in FIG. 1 employs a client-server architecture, the present subject matter is of course not limited to such an architecture, and could equally well find application in a distributed, or peer-to-peer, architecture system, for example.

The computing device 106 is configured to authenticate the user 104 using one or more image recognition techniques. In one embodiment, the computing device 106 instantiates a facial recognition application or other module that uses an image of the user 104 to determine whether the user 104 is authorized to access the computing device 106. For example, by using a camera or other image capture device of computing device 106. The facial recognition application may leverage one or more image recognition libraries for performing the facial recognition, such as the Open Source Computing Vision Library (OpenCV), which is an open source computer vision and machine learning software library. OpenCV includes interfaces for a variety of computing programming and scripting languages, such as C++, Python, Java, and MATLAB and can be instantiated under various operating systems including Microsoft Windows, Linux, Google Android, and Mac OS. Additionally and/or alternatively, the facial recognition application may be implemented using Windows Hello, which is a biometric sign-in system for a computing operating system, and is available from the Microsoft Corp., located in Redmond, Wash.

Accordingly, the computing device 106 may include one or more libraries from OpenCV, which are then accessed by the applications instantiated by the computing device 106. Additionally and/or alternatively, the authentication server 110 may instantiate one or more libraries of OpenCV, and the computing device 106 may communicate one or more images to the authentication server 110 for authentication and/or further processing. Further still, the computing device 106 and/or the authentication server 110 may instantiate one or more applications developed using Windows Hello.

In one embodiment, the user 104 interacts with the computing device 106 to establish a baseline image template of the user 104. As one of ordinary skill in the art will understand, a baseline image template is an image template that a computing device uses to perform comparisons with other images, and to determine whether one or more images include the baseline image template and/or are similar to the baseline image template. In this context, the baseline image template may be used by the computing device 106 to authenticate the user 104, where the user 104 uses the computing device 106 to acquire one or more images of the user 104 and compares the acquired image(s) with the baseline image template. Additionally and/or alternatively, the authentication server 110 may receive one or more acquired image(s) from the computing device 106 and communicate instructions to the computing device 106 as to whether the user 104 is authenticated. Thus, in this regard, one or more of the operations described as being performed by the computing device 106 may instead be performed by the authentication server 110.

The comparisons performed by the computing device 106 include, but are not limited to, histogram matching, template matching, and/or feature matching. Where the computing device 106 is configured to perform template matching, the computing device 106 may be configured to employ various template matching techniques including, but not limited to, sum of squared difference, normalized sum of square differences, cross-correlation, normalized cross-correlation, correlation-coefficient, and other such template matching techniques or combinations thereof.

Where the computing device 106 employs feature matching, the computing device 106 may determine various features from the baseline image template, and store these determined features as baseline image features. Thus, when the computing device 106 acquires an image of the user 104 to authenticate (e.g., by capturing an image of the user 104 using a camera), the computing device 106 may determine various features from the captured image (e.g., captured image features), and compare the captured image features with the baseline image features. The types of feature matching performable by the computing device 106 include, but are not limited to, scale-invariant feature transform (SIFT), speeded-up robust features (SURF), robust independent elementary feature (BRIEF), Features from Accelerated Segment Test (FAST), and Oriented FAST and Rotated BRIEF (ORB).

One of the challenges in using image-based authentication is that the captured image of the 104 may vary depending on the environment in which the computing device 106 is being used. For example, the user 104 may be in an environment that is dark or has low-lighting conditions or the user 104 may be in an environment that is overly bright and has bright-lighting conditions. In this context, low light and bright light are relative to the light acquired by the camera of the computing device 106. Thus, the user 104 may perceive lighting conditions that he or she believes is acceptable but the computing device 106 obtains an image of the user 104 that has measurably dark areas and/or overexposed areas. As another example, the user 104 may be unable to properly focus the camera lens of the computing device 106, in which case, the resulting image may be blurry or out-of-focus.

Where the computing device 106 acquires an image of the user 104 with problematic qualities (e.g., underexposed areas, overexposed areas, blurriness, obscured portions, etc.), the computing device 106 and/or the authentication server 110 may be unable to match the acquired image with the baseline image template (e.g., through one or more template matching techniques and/or one or more image feature matching techniques). Accordingly, where the computing device 106 and/or the authentication server 110 is unable to authenticate the user 104 using image-based authentication, the computing device 106 may use a secondary means of authenticating the user 104. In one embodiment, the secondary means include displaying a prompt on a display of the computing device 106 that requests the user 104 to provide a particular input. The particular input may include, but is not limited, a PIN, a pattern, a selection of one or more images, or any other combinations of input. The particular input may also include non-tactile input, such as a voice recognition input.

The computing device 106 may then determine whether the secondary means of authentication authenticate the user 106. Where the user 106 has successfully authenticated himself or herself using the secondary means, the computing device 106 may store a temporary or transient copy of the captured image of the user 106 that the computing device 106 used to unsuccessfully authenticate the user. The computing device 106 stores the temporary or transient copy based on the presumption that, because the user 104 has authenticated himself or herself using the secondary means of authentication, then the image quality (e.g., the lighting conditions) of the captured image used to initially authenticate the user 104 were probably poor (e.g., the light of the captured image was below or above a predetermined ambient light threshold), which resulted in the computing device 106 being unable to authenticate the user 104 through image-based authentication. Additionally and/or alternatively, the computing device 106 instructs the authentication server 110 to store the captured image as the temporary or transient image.

The computing device 106 then uses the temporary or transient copy of the captured image to later authenticate the user 104. In one embodiment, the computing device 106 and/or the authentication server 110 establishes the temporary or transient copy of the captured image as a transient image template by which to later authenticate the user 104. In this embodiment, the computing device 106 and/or the authentication server 110 uses the transient image template to compare with later acquired images of the user 104, such as through template matching, histogram matching, and/or feature matching. Where feature matching is employed, the computing device 106 may determine one or more features from the transient image template, and store the determined features as temporary features for comparing with determined features of later acquired images of the user 104.

The transient image template is temporary or transient because the computing device 106 and/or authentication server 110 may be programmed or configured with a predetermined time period that indicates how long the computing device 106 and/or the authentication server 110 should retain the temporary or transient copy of the captured image. In this regard, where the computing device 106 and/or the authentication server 110 receives a request to authenticate the user 104 using image-based authentication, and the predetermined time period for the transient image template has not expired, the computing device 106 and/or the authentication server 110 compares an acquired image of the user 104 with the transient image template (e.g., through template matching, feature matching, etc.). In some instances, the computing device 106 may compare the acquired image with both the baseline image template (e.g., in a first-pass authentication attempt) and the transient image template (e.g., in a second-pass authentication attempt where the first-pass authentication attempt fails).

There are several benefits to configuring the computing device 106 and/or the authentication server 110 to use a transient image template. A first benefit is that the transient image template solves the near-term problem of the user 104 being in an environment with poor lighting conditions. While the computing device 106 and/or the authentication server 110 may have been programmed or configured with a baseline image template of the user 104, the images of the user 104 acquired in the poor lighting environment may result in authentication failures by the computing device 106 and/or the authentication server 110 as the baseline image template may have different levels of lighting exposure than the acquired images. Thus, the transient image template, acquired in the poor lighting environment, serves as a better basis by which to compare later acquired images of the user 104 in the poor lighting environment. The foregoing features result in improved usability and human-machine interactions because these features reduce the number of times that the user authenticates himself or herself using the secondary means of authentication (e.g., the user's PIN). For example, where the user accesses their phone regularly while at a particular location with particular lighting conditions, the computing device 106 queries for the user's PIN only on the first failed attempt and then "learns" from that failure so as not to query the user again with a PIN for those same lighting conditions.

Another benefit is that the computing device 106 and/or authentication server 110 frees up the storage space used by the transient image template. As the user 104 is likely to use the computing device 106 in different environments, and that the lighting conditions of the different environments is likely to vary, the computing device 106 and/or authentication server 110 may store a number of transient image templates. Thus, through continued use of the computing device 106, an increasing amount of storage space of the computing device 106 and/or of the authentication storage 110 becomes devoted to storing transient image templates. Thus, by deleting the transient image templates after a predetermined time period has elapsed, the computing device 106 and/or the authentication server 110 frees up storage space to use for other purposes or to store additional transient image templates.

Yet another benefit of the deletion of the transient image templates is in the security that it provides. As the number of transient image templates increases, the likelihood that an image acquired of the user 104 matches one or more of the transient image templates also increases. Thus, the inherent security provided by using image-based authentication decreases. Accordingly, by deleting the transient image template after the expiration of a predetermined time period, the computing device 106 and/or the authentication server 110 returns to its security state with the baseline image template.

In addition to, or instead of, the foregoing use of time-limited transient image templates, the computing device 106 and/or the authentication server 110 may be configured to assign particular locations to particular transient image templates. In one embodiment, and as discussed below with reference to FIG. 2, the computing device 106 may include a Global Positioning System (GPS) transceiver, which the computing device 106 uses to determine its location. At the time the computing device 106 and/or authentication server 110 creates a transient image template from an acquired image of the user 104, the computing device 106 and/or authentication server 110 may associate a set of GPS coordinates with the transient image template. Where featuring matching is employed by the computing device 106 and/or authentication server 110, the computing device 106 and/or authentication server 110 may also associate the GPS coordinates with one or more transient image features. In this manner, should the user 104 move to various locations, the computing device 106 knows which transient image template and/or transient image features to use in a comparison of an acquired image of the user 104 based on the location of the computing device 106.

In one embodiment where the computing device 106 and/or authentication server 110 associates GPS coordinates with transient image templates and/or transient image features, the computing device 106 and/or the authentication server 110 may also establish a predetermined range in which a transient image template and/or transient image feature is referenced relative to its associated GPS coordinates. The predetermined range may vary from a few feet to a few hundred yards. In this manner, where the user is within the predetermined range of a stored set of GPS coordinates (e.g., one or more GPS coordinates associated with one or more transient image templates or transient image features), the computing device 106 and/or the authentication server 110 references the transient image template and/or the transient image templates associated with the stored set of GPS coordinates. Thus, the computing device 106 need not be at the exact same location as the computing device 106 was located when the transient image template and/or transient image features were created for performing image-based authentication using the transient image template and/or the transient image features.

In addition to deleting the transient image templates and/or transient image features based on the expiration of assigned predetermined time periods, the computing device 106 and/or the authentication server 110 may also delete the transient image templates and/or transient image features based on location. In one example, the computing device 106 and/or the authentication server 110 may be configured to delete the transient image templates and/or transient image features when the computing device 106 is outside of a predetermined range associated with one or more of the GPS coordinates associated with the transient image templates and/or transient image features. The predetermined range may be measured using one or more distance metrics including, but not limited to, feet, yards, meters, kilometers, miles, and other such measures of distances. In one embodiment, the predetermined range is configurable by the user 104, such as by providing an input at the time the transient image template and/or transient image feature is created indicating the predetermined range that would trigger a deletion of the transient image template and/or transient image features. In another embodiment, the computing device 106 and/or authentication server 110 are preconfigured with a predetermined range that causes the deletion of the transient image template and/or transient image features.

In addition, where the computing device 106 is using one or more transient image template(s), the computing device 106 may be considered to be operating in a transient mode. In one embodiment, when the computing device 106 receives a facial image to authenticate, the computing device 106 may first determine whether it is operating in its transient mode. If the computing device 106 is operating in the transient mode, the computing device 106 selects one or more transient image templates to compare with the one or more acquired images. Further still, the computing device 106 may be configured with various locations such that a transient mode flag or other identifier is associated with each of the various locations. In this regard, where the computing device 106 is at a particular location, the computing device 106 may first determine whether an identifier for the particular location is stored in memory and, if so, whether that particular location is associated with a transient timer (e.g., whether for that particular location the computing device 106 should operate in transient mode). In this manner, the computing device 106 may associate a transient mode with one or more locations.

Thus, this disclosure describes various embodiments of using transient image templates and/or transient image features to perform image-based authentication of the user 104. This disclosure also describes associating one or more locations with the transient image templates and determining whether the computing device 106 is, or should be, operating in a transient mode for a particular location. Furthermore, any of the foregoing embodiments may be used in combination with each other; thus, the computing device 106 may be configured according to various combinations of the foregoing embodiments.

Figure 2:
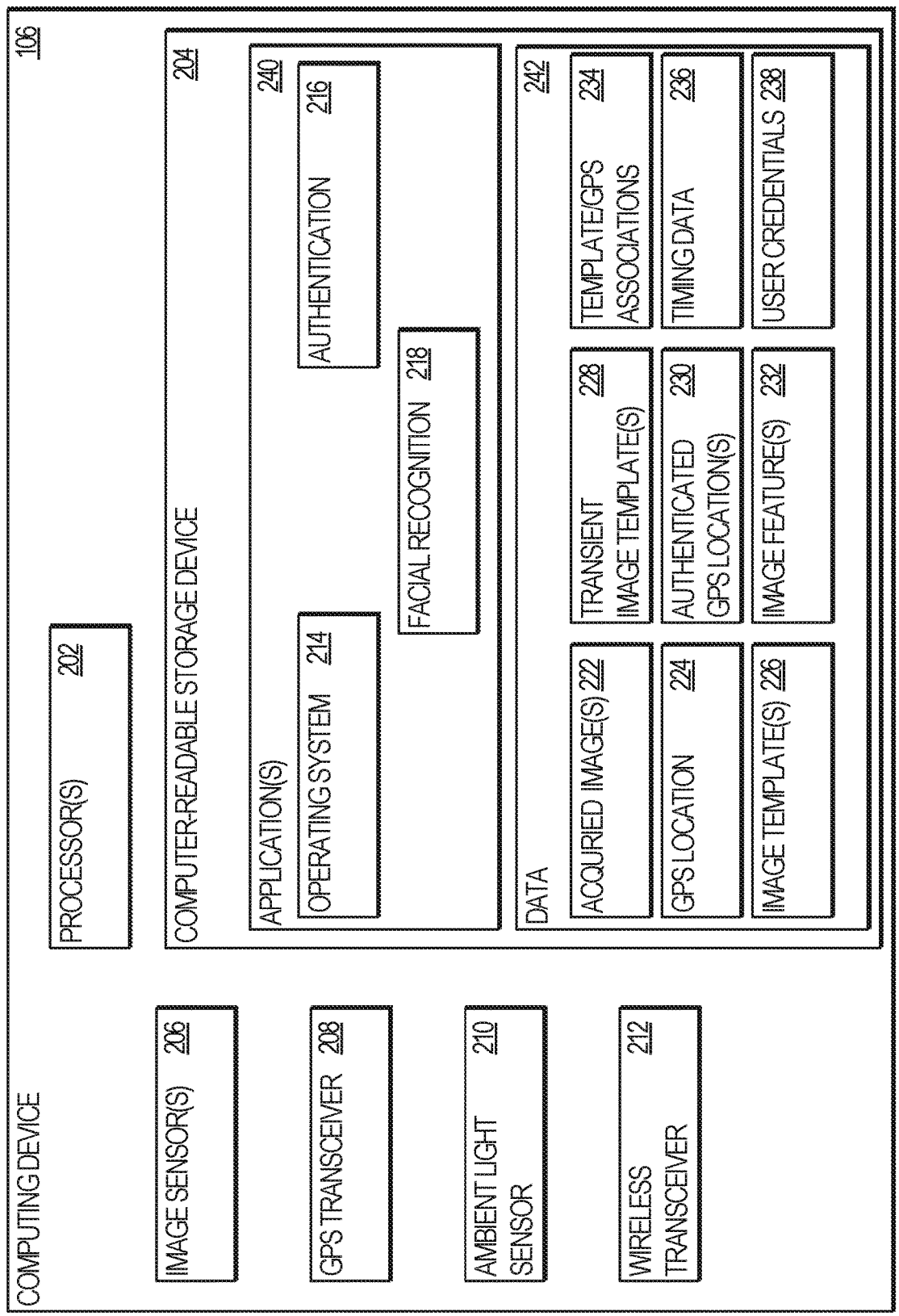
FIG. 2 illustrates an example embodiment of the application(s) and data of the computing device of FIG. 1.

FIG. 2 illustrates applications and data of the computing device 106 illustrated in FIG. 1, according to an example embodiment, where the computing device 106 is configured according to one or more of the foregoing embodiments. As shown in FIG. 2, and in one embodiment, the computing device 106 is a mobile device 106. The computing device 106 is configured with various sensors and/or transceivers 206-212 and includes various application(s) 240 and data 242 to facilitate the image-based authentication of the user 104.

The various functional sensors, transceivers, and other hardware and/or software of the computing device 106 and/or the authentication server 110 may reside on a single device or may be distributed across several computers in various arrangements. The various components of the computing device 106 and/or the authentication server 110 may access one or more databases and each of the various components of the computing device 106 and/or the authentication server 110 may be in communication with one another. Further, while the components of FIG. 2 are discussed in the singular sense, it will be appreciated that in other embodiments multiple instances of the components may be employed.

In one embodiment, the computing device 106 includes one or more processors 202 that execute or implement one or more of the applications 240. The one or more processors 202 may be any type of commercially available processor, such as processors available from the Intel Corporation. Advanced Micro Devices, Texas Instruments, or other such processors. Further still, the one or more processors may include one or more special-purpose processors, such as a Field-Programmable Gate Array (FPGA) or an Application Specific Integrated Circuit (ASIC). The one or more processors may also include programmable logic or circuitry that is temporarily configured by software to perform certain operations. Thus, once configured by such software, the one or more processors become specific machines (or specific components of a machine) uniquely tailored to perform the configured functions and are no longer general-purpose processors.

The computing device 106 may further include various computer-readable storage device(s) 204 and/or computer-readable medium(s) for storing the application(s) 240 and/or the data 242. The computer-readable storage device 204 includes one or more devices configured to store instructions and data temporarily or permanently and may include, but not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "computer-readable storage device" should be taken to include a single device or multiple devices (e.g., a centralized or distributed database, or associated caches and servers) able to store the application(s) 240 and the data 242. Accordingly, the computer-readable storage device 204 may be implemented as a single storage apparatus or device, or, alternatively and/or additionally, as "cloud-based" storage systems or storage networks that include multiple storage apparatus or devices.

The computing device 106 may also include various sensors and/or transceivers in furtherance of establishing one or more temporary template images and/or temporary template features. In one embodiment, the computing device 106 includes one or more image sensor(s) 206 for acquiring one or more images of the user 104, which the computing device 106 may use as one or more baseline image templates, for determining one or more baseline image features, as one or more transient image templates, for determining one or more transient image features, and/or for attempting to authenticate. Examples of image sensor(s) 206 include, but are not limited to, semiconductor charge-coupled devices (CCD), active pixel sensors in complementary metal-oxide-semiconductor (CMOS), and/or active pixel sensors in N-type metal-oxide-semiconductor (NMOS). The image sensor(s) 206 may also include infrared sensors 206, such as a forward-looking infrared (FLIR) sensor.

Additionally and/or alternatively, the computing device 106 may include a GPS transceiver 208. The GPS transceiver 208 is configured to obtain one or more GPS coordinates corresponding to the location of the computing device 106. As discussed below, the obtained GPS coordinates may be associated with one or more transient image templates and/or transient image features upon the successful authentication of the user using one or more secondary means of authentication.

Furthermore, the computing device 106 may include one or more ambient light sensors 210. The one or more ambient light sensors 210 are configured to measure the ambient light of the environment in which the computing device 106 is located. For example, the one or more ambient light sensors 210 may provide a measurement of the ambient light of an image acquired by the image sensor(s) 206. As discussed below with reference to FIGS. 3A-3B, the ambient light measured by the ambient light sensors 210 may serve as an indicator as to whether the environment in which the computing device 106 is located is dark or bright (e.g., the measurements are below or above corresponding ambient light thresholds), which would indicate that an authentication failure in comparing an acquired image with a baseline image template is likely due to poor lighting conditions rather than other defects in the acquired image. In some examples, the ambient light sensor may be a function of the image sensor(s) 206.

Finally, the computing device 106 may include one or more wireless transceivers 212 for communicating wirelessly with one or more other devices and/or systems, such as the authentication server 110. In this context, the one or more wireless transceivers 212 include various transceivers that facilitate wireless communications including, but not limited to, a Wi-Fi transceiver (e.g., a transceiver configured to communicate using IEEE 902.11 a/b/g/n), a Bluetooth® transceiver, a cellular radio (e.g., a radio configured to communicate using Long-Term Evolution (LTE), Global System for Mobile communications (GSM), Code-division multiple access (CDMA), and other such wireless transceivers or combinations thereof. In one embodiment, the one or more wireless transceivers 212 are configured to communicate data to and/or from the computing device 106, such as one or more acquired images and/or authentication input provided by the user 104.

With reference to FIG. 2, the application(s) 240 of the computing device 106 are configured to perform image-based authentication of the user 104 and to grant and/or deny access to the computing device 106 based upon the results of the image-based authentication. In addition, the application(s) 240 are configured to store transient or transient image templates and/or transient image features in response to the image-based authentication process. In one embodiment, the application(s) 240 are written in a computer-programming and/or scripting language. Examples of such languages include, but are not limited to, C, C++, C#, Java, JavaScript, Perl, Python, or any other computer programming and/or scripting language now known or later developed.

To perform these and other operations in furtherance of these results, the application(s) 240, include but are not limited to, an operating system 214, an authentication application 216, and a facial recognition application 218. Although FIG. 2 references the items 214-218 as "applications," one of ordinary skill in the art will appreciate that these items 214-218 may also be implemented as sub-modules of an independent application or may also be implemented as one or more software libraries to which another application (e.g., the operating system 214) has access. Further still, while the computing device 106 may include alternative and/or additional modules or applications (e.g., a networking application, a printing application, a software-implemented keyboard, etc.), such alternative and/or additional modules and/or applications are not germane to this disclosure and the discussion of such is hereby omitted for brevity and readability.

The data 242 that is used and/or supports the application(s) 240 include, but is not limited to, one or more acquired image(s) 222, a current GPS location 224, one or more image template(s) 226, one or more temporary (or transient) image template(s) 228, and one or more authenticated GPS location(s) 230. In addition, the data 242 may include one or more determined image feature(s) 232, one or more associations 234 between the transient image template(s) 228 and the authenticated GPS location(s) 230, various timing data 236, and the user credentials 238 that are used to authenticate the user 104. As with the application(s) 240, the data 242 may include alternative and/or additional data, such as user credentials, operating system states, web browser data, etc., that are not germane to this disclosure and the discussion of such is hereby omitted for brevity and readability.

The operating system 214 is configured to execute and/or access one or more of the application(s) 240 and to control the functionalities of the various sensors and/or transceivers 206-212. The operating system 214 may be configured to operate the computing device 106 in various states, such as an unlocked and locked state, where the unlocked state allows the user 104 to access the various functionalities of the operating system 214 and the locked state restricts the user 104 from accessing the various functionalities of the operating system 214 and/or to place restrictions on the mode of operation of the computing device 106. Examples of operating systems that the one or more processor(s) 202 may execute include, but are not limited to, Microsoft®

Windows 10 Mobile, Google Android, Apple iOS, Blackberry Secure, and other such operating systems. In one embodiment, the operating system 214 leverages an authentication application 216 to authenticate the user 104 as an authorized user of the computing device 104.

The authentication application 216 is configured to authenticate the user 104 using one or more authentication means. Examples of these authentication means include non-biometric means, such as a username/password combination, a PIN, a secret pattern, or other input-based authentication means. The authentication application 216 may also perform biometric-based authentication including, but not limited to, fingerprint recognition, image-based authentication, voice analysis recognition, and other such means for biometric authentication.

In one embodiment, the authentication application 216 is configured to perform image-based authentication of the user 104 in response to a request by the operating system 214 to grant the user 104 access to the computing device 106. For example, the computing device 106 may be in a locked state and the user 104 has requested that the computing device 106 be placed into an unlocked state. Thus, to unlock the computing device 106, the operating system 214 may request that the authentication application 216 authenticate the user.

In one embodiment, the authentication application 216 authenticates the user 104 via image-based authentication. In this regard, the data 242 may include one or more image template(s) 226 that correspond to images of a user authorized to access the computing device 106, such as one or more images of the user 104. As one of ordinary skill in the art will understand, an image template, as used in facial recognition, is an image that a facial recognition program or module attempts to find in another image or in a portion of the other image. The image template(s) 226 may be stored in one or more image formats including, but not limited to, Portable Network Graphics (PNG), Bitmap (BMP), Joint Photographic Experts Group (JPEG/JPG), or other such image formats or combinations thereof.

Accordingly, the authentication application 216 may invoke and/or execute the facial recognition application 218 to perform a facial recognition operation of the user 104 using the one or more image template(s) 226. In one embodiment, the one or more image template(s) 226 are established during a registration operation, in which one or more acquired image(s) are assigned as baseline image template(s) by which to later authenticate the user 104 when the user 104 attempts to access the computing device 106. In this regard, a baseline image template(s) 226 is an image template that remains on the computing device 106 and/or authentication server 110.

To perform the facial recognition operation, the facial recognition application 218 may invoke the one or more image sensor(s) 206 to acquire one or more images of the user 104, which are subsequently stored as the acquired image(s) 222. In this embodiment, the facial recognition application 218 then performs one or more image template matching operations in an attempt to match one or more of the image template(s) 226 which the acquired image(s) 222. As discussed above, the image template matching operations may include, but are not limited to, sum of squared difference, normalized sum of square differences, cross-correlation, normalized cross-correlation, correlation-coefficient, and other such template matching techniques or combinations thereof.

Additionally and/or alternatively, the facial recognition application 218 may perform feature-based matching use one or more image feature(s) 232 extracted and/or determined from the image template(s) 226. Accordingly, the image feature(s) 232 to be matched may be stored as image feature(s) 232. As discussed above, the facial recognition application 218 may perform image feature matching operations including, but not limited to, SIFT, SURF, BRIEF, FAST, ORB, or combinations thereof.

As contemplated by this disclosure, the disclosed subject matter addresses the circumstances where an initial image-based authentication operation fails due to one or more environmental conditions, such as due to the poor lighting conditions of the environment in which the acquired image(s) 222 were acquired. Although the image-based authentication performed by the authentication application 216 may succeed on a first attempt in a particular environment, the subject matter of this disclosure is directed to subsequent attempts of unlocking the computing device 106 where there is a failure in the image-based authentication, particularly in circumstances where the lighting or other environmental conditions affect the resulting image of the user 104 acquired by the computing device 104.

In addition, this disclosed subject matter addresses the circumstances where additional time may be needed for one or more of the transient image template(s) 228 to be effective. Accordingly, a transient timer is incrementally increased where the computing device 106 receives a request for access, performs image-based authentication, and determines that the computing device 106 was recently engaged in a transient mode of operation (e.g., using one or more transient image template(s) 228 to perform the image-based authentication). In one embodiment, the transient mode of operation is associated with a location. In this embodiment, different locations may be associated with different modes of operation (e.g., a first location may be associated with a baseline mode of operation and a second location may be associated with a transient mode of operation). In another embodiment, the transient mode of operation is not specific to any one location. Where the computing device 106 determines that it was recently engaged in a transient mode of operation, the computing device 106 then incrementally increases a transient timer associated with one or more transient image template(s) 228. The increase to the transient timer may be particular to the location to which the transient timer is associated. Additionally and/or alternatively, the increase to the transient timer may be a global increase that affects one or more transient timers.

In one embodiment, the facial recognition application 218 acquires one or more image(s) 222 of the user 104 in response to a request from the authentication application 216, such as where the user 104 has requested the operating system 214 to unlock the computing device 106. For example, the facial recognition application 218 may instruct one or more of the image sensor(s) 206 to acquire one or more image(s) 222 of the user 104. Where the facial recognition application 218 is configured to perform template matching operations, the facial recognition application 218 may perform one or more template matching operations using the acquired image(s) 222 and the image template(s) 226. Additionally and/or alternatively, where the facial recognition application 218 is configured to perform feature matching operations, the facial recognition application 218 may determine one or more features from the acquired image(s) 222, and compare these determined features with the image feature(s) 232 of the image template(s) 226. The facial recognition application 218 may then inform the authentication application 216 whether there is a match between the acquired image(s) 222 (or acquired image feature(s)) and the one or more image template(s) 226 (or image feature(s) 232). As one of ordinary skill in the art will understand, a match does not necessarily signify a 100% correspondence between the compared image(s) 222-226 and/or compared feature(s), but that the facial recognition application 218 has determined that there is a likelihood of a match (e.g., a 90% or 95% probability).

Where the facial recognition application 218 is unable to determine whether there is a match (e.g., the facial recognition application 218 returns an execution call with an exception or error message) or the facial recognition application 218 determines that there is not a match, the facial recognition application 218 informs the authentication application 216 accordingly (e.g., by returning an execution call with a particular message, error value, and/or other indicator). The authentication application 216 may then prompt the user 104, via a display of the computing device 106, to authenticate himself or herself using a secondary means of authentication (e.g., by providing a PIN, secret pattern, etc.).

In one embodiment, the authentication application 216 references the user credentials 238 to authenticate the user 104 via the secondary means of authentication. The user credentials 238 may include, but are not limited to, a PIN, a secret pattern, a username and password, or other set of credentials that authenticate the user 104 to the computing device 106.

Where the user 104 successfully authenticates himself or herself to the authentication application 216, this signals to the authentication application 216 that the user 104 is authorized to access the computing device 106. Further still, it indicates that the acquired image(s) 222 may have been visually deficient (e.g., over exposed, underexposed, blurry, etc.) but that the acquired image(s) 222 could have been used to authenticate the user 104.

Accordingly, in one embodiment, the facial recognition application 218 is established with various thresholds, a margin of error, and/or a degree of tolerance to accommodate situations where the acquired image(s) 222 should have authenticated the user 104, but the quality of the acquired image(s) 222 prevented from the facial recognition application 218 from confirming the authentication. Where the comparison of the acquired image(s) 222 with the image template(s) 226 indicate a failed match, but are within the margin of error, the acquired image(s) 222 are temporarily stored. Where the user 104 then authenticates himself or herself to the authentication application 216 via the secondary means of authentication following the unsuccessful authentication of the user 104 via the acquired image(s) 222, the facial recognition application 218 then stores one or more of the acquired image(s) 222 as transient images or transient image template(s) 228. The acquired image(s) 222 are stored as the transient image template(s) 228 because the comparison of the acquired image(s) 222 with the baseline image template(s) 226 has indicated that the acquired image(s) 222 are almost a sufficient match (e.g., because the comparison yields a value at or above a margin of error but below a matching threshold), which indicates that one potential factor affecting the comparison could be the environment in which the acquired image(s) 222 were acquired. Thus, by establishing the acquired image(s) 222 as the transient image template(s) 228, the facial recognition application 218 can reference the transient image template(s) 228 to authenticate the user 104 in subsequent attempts under the presumption that the subsequent images are being acquired within the same environment (e.g., under the same environmental conditions) as the transient image template(s) 228.

Recognizing that the user 104 may move the computing device 106 from one environment to another environment, this disclosed facial recognition application 218 is configured to associate timing data 236 with one or more of the transient image template(s) 228. In one embodiment, the timing data 236 includes a transient timer having a predetermined time period, wherein a transient timer is associated with each of the transient image template(s) 228. The predetermined time period may be measured in seconds, minutes, hours, days, or any other increment of time. One example of a predetermined time period is five minutes.

In addition, the timing data 236 may include an incremental value that the facial recognition application 218 and/or authentication application 216 uses to increment one or more of the transient timers. In one embodiment, the incremental value is a constant value programmed by an administrator or developer of the operating system 214. Additionally and/or alternatively, the incremental value is configurable by a user 104 of the computing device 106 via one or more graphical user interfaces displayable by the operating system 214. By being a configurable incremental value, the user 104 can adjust the amount of time that the computing device 106 remains in the transient mode. For instance, the user 104 may desire to extend the transient mode for a first location by five minutes but may desire to extend the transient mode for a second location by three minutes. Like the transient timer of the transient image template(s) 228, the incremental value may be stored as part of the timing data 236.

Moreover, the timing data 236 may include a transient timestamp that indicates a time when a transient timer, associated with a particular transient image template 228, expired. The timing data 236 may also include a recent transient mode threshold that indicates a duration of time in which the computing device 106 is to be considered as having recently exited transient mode. For example, the transient mode threshold may be assigned a value of three minutes, which indicates that, for three minutes after exiting a transient mode, the computing device 106 will be considered to have recently exited transient mode. Accordingly, at minute four, the computing device 106 will not be considered to have recently exited transient mode. As discussed below with regard to FIGS. 7A-7C, whether the computing device 106 has recently exited a transient mode may affect whether a transient timer associated with one or more of the transient image template(s) 228 is extended by a predetermined amount.

During the lifetime of a transient timer, the operating system 214 and/or the facial recognition application 218 decrements the transient timer. In one embodiment, upon expiration of the transient timer, the corresponding transient image template 228 is deleted by the facial recognition application 218. By deleting the transient image template 228 associated with the expired timer, the facial recognition application 218 preserves the security of the computing device 106 as well as reclaims any storage space that the transient image template may have been using. In another embodiment, upon expiration of the transient timer, the corresponding transient image template 228 is disabled by the facial recognition application 218, and the computing device 106 reverts to a baseline mode of operation, where one or more of the baseline image template(s) 226 are used for image-based authentication. In this embodiment, one or more of the transient image template(s) 228 until a condition is satisfied (e.g., a predetermined date and/or time is reached, the computing device 106 has been rebooted five times, etc.) or until the user 104 manually deletes the one or more transient image template(s) 228.

In addition to, or instead of, associating timing data 236 with one or more of the transient image template(s) 228, the computing device 106 may also be configured to associate one or more authenticated GPS location(s) 230 with the one or more transient image template(s) 228. These associations may be stored as the template/GPS associations 234. In some instances, the physical location of the computing device 106 may affect the image quality of the one or more acquired image(s) 222. In general, an authenticated GPS location is a location where the user 104 has authenticated himself or herself to the computing device 106 (e.g., via the authentication application 216). Further still, the authentication application 216 may record a GPS location 224 as an authenticated GPS location 230 where the user 104 was required to use a secondary means of authentication in response to a failure in the image-based authentication mechanism.

As discussed above, the facial recognition application 218 may store one or more acquired image(s) 222 as one more transient image template(s) 228. In addition, where the authentication application 216 is configured to communicate with the GPS transceiver 208 and/or access the stored GPS location 224 in the data 242, the authentication application 216 and/or the facial recognition application 218 may establish an association 234 between the one or more transient image template(s) 228 and the GPS location 224 (which becomes subsequently stored as an authenticated GPS location 230). In this manner, where the user 104 remains at a particular location or revisits a particular location, the facial recognition application 218 and/or the authentication application 216 queries the authenticated GPS location(s) 230 to determine whether there is an existing authenticated GPS location 230 for the particular location (e.g., as indicated by the GPS location 224). Where there is an authenticated location 230 for the particular location, the facial recognition application 218 then queries the template/GPS associations 234 to obtain the corresponding transient image template(s) 228 associated with the authenticated location 230. The facial recognition application 218 then references the obtained transient image template to perform image-based authentication of the user 104 with one or more of the acquired image(s) 222.

In addition, one or more of the transient image template(s) 228 may also be associated with an authenticated GPS location 230 and timing data 236 (e.g., an expiration timer). In this regard, where the computing device 106 is at, or within a predetermined distance to, an authenticated GPS location 230, the facial recognition application 218 and/or the authentication application 216 determines whether there is a corresponding transient image template 228 and, if so, whether timing data 236 indicates that the transient image template 228 has expired. Where the transient image template 228 has not expired, the facial recognition application 218 and/or the authentication application 216 then references the transient image template in performing an image-based authentication.

In this manner, the computing device 106 is configured to determine which transient image template 228 to use based on the location of the computing device 106. As the computing device 106 may include one or more transient image template(s) 228, an association with an authorized GPS location 230 (e.g., via the template/GPS associations 234) allows the computing device 106 to more readily determine which of the transient image template(s) 228 to use in performing image-based authentication of the user 104. Accordingly, the use of the authorized GPS location(s) 230 and the template/GPS associations 234 represent an improvement over prior art techniques for authenticating a user.

One of ordinary skill in the art will appreciate that the GPS location 224 is not solely limited to a location determined using GPS. In this regard, the GPS location 224 may be any location determined by the computing device 106 using one or more combinations of geolocation technologies including, but not limited to, cellular triangulation (e.g., via a wireless transceiver 212), Wi-Fi-based positioning system (WiPS/WFPS), Internet Protocol (IP) address geolocation, and other such geolocation technologies. Accordingly, the authenticated GPS location(s) 230 are not limited to those locations determined using GPS, but also include any location determined using one or more of the foregoing geolocation technologies.

Figure 3A:
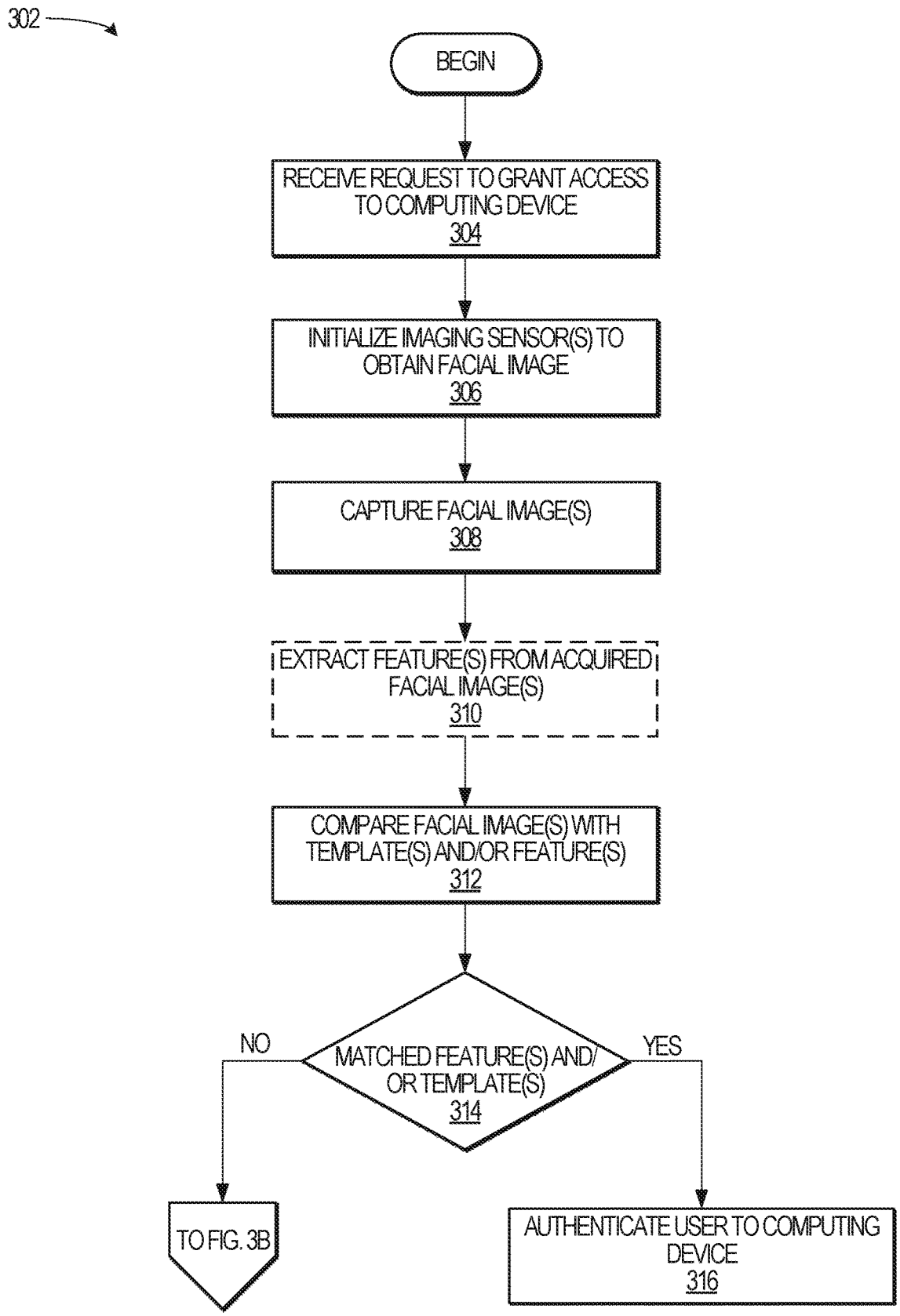
FIGS. 3A-3B illustrate a method, in accordance with an example embodiment, for generating transient image template from acquired image used in authenticating the user of FIG. 1 to the computing device of FIG. 1.
Figure 3B:
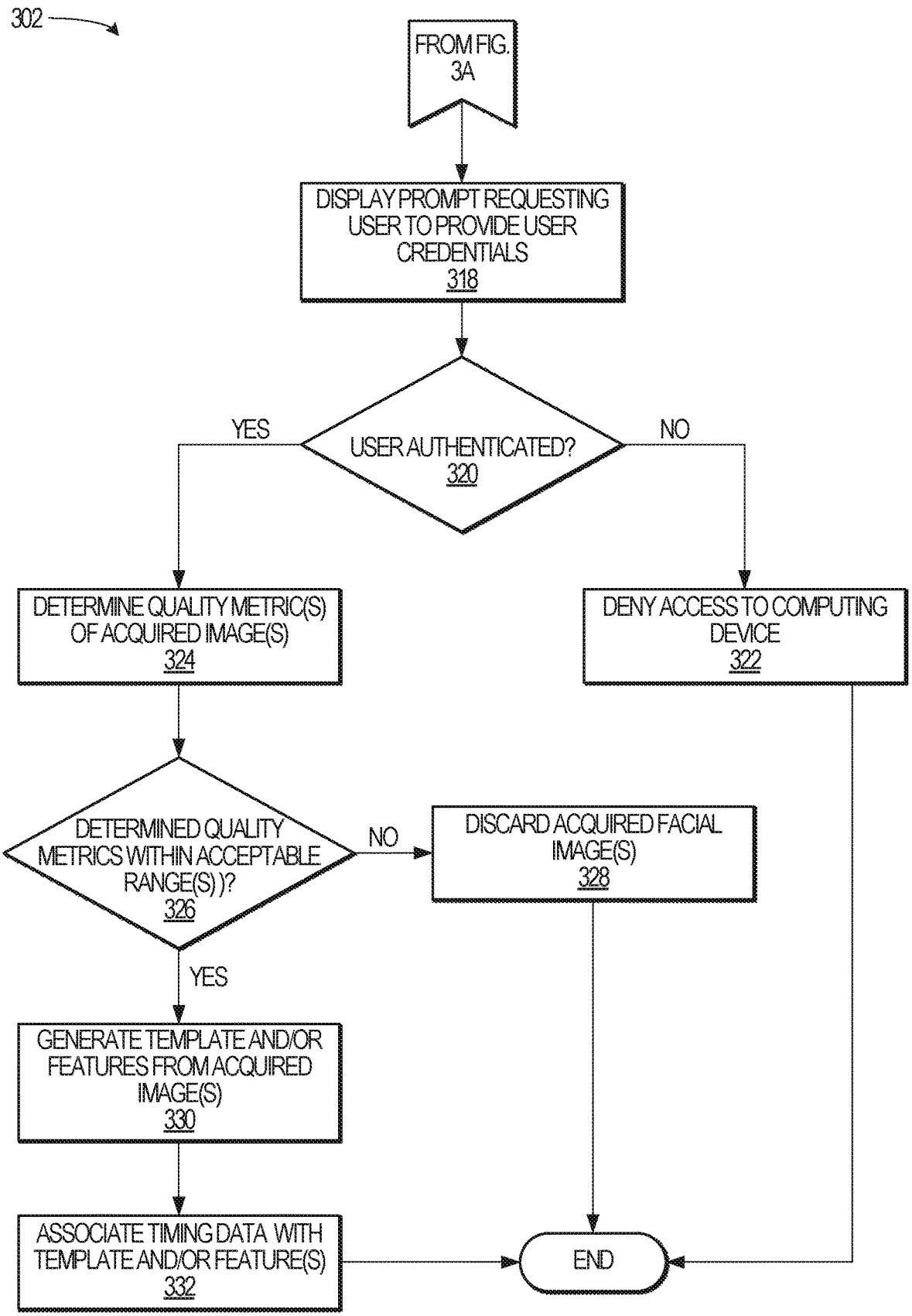

FIG. 3A-3B illustrate a method 302, in accordance with an example embodiment, for generating transient image template(s) 228 from acquired image(s) 222. The method 302 may be performed by one or more of the components illustrated in FIG. 2 and is discussed by way of reference thereto.

Initially, and with reference to FIGS. 2 and 3A, the computing device 106 receives, via the operating system 214, a request for access (Operation 304). The request for access may comprise a request to perform an image-based authentication of the user 104. The operating system 214 and/or the authentication application 216 then initializes one or more of the image sensor(s) 206 for acquiring one or more images of the user 104 (Operation 306). The image sensor(s) 206 then acquire the one or more images of the user 104 and store such image(s) as the acquired image(s) 222 (Operation 308). In some embodiments, the authentication application 216 and/or the facial recognition application 218 then determines one or more image feature(s) from the acquired image(s) 222 (Operation 310). Although shown as an optional operation, the Operation 310 may be performed alternatively and/or additionally to one or more of the operations shown in FIG. 3A.

The facial recognition application 218 then compares the acquired image(s) 222 with one or more of the baseline image template(s) 226 (Operation 312). As discussed above, the image template matching operations may include, but are not limited to, sum of squared difference, normalized sum of square differences, cross-correlation, normalized cross-correlation, correlation-coefficient, and other such template matching techniques or combinations thereof. Additionally and/or alternatively, the facial recognition application 218 performs one or more feature matching operations using baseline image feature(s) 232 and one or more features determined from the acquired image(s) 222 (Operation 312).

The facial recognition application 218 then informs or communicates an instruction to the authentication application 216 whether the one or more acquired image(s) 222 match the baseline image template(s) 226 (Operation 314). Where this determination is made in the affirmative (e.g., the "YES" branch of Operation 314), the method 302 proceeds to Operation 316 where the authentication application 216 confirms that the user 104 is authorized to access the computing device 106. Alternatively, where this determination is made in the negative (e.g., the "NO" branch of Operation 314), the method 302 proceeds to Operation 318 on FIG. 3B.

Referring to FIG. 3B, at Operation 318 the computing device 106, via the operating system 214, displays a prompt to the user 104 requesting that the user 104 authenticate himself or herself using a second means of authentication. For example, the operating system 214 may display a prompt requesting that the user 104 provide one or more user credentials, such as a PIN, secret pattern, username and password, fingerprint, or other such user credentials.

The provided user credentials are then compared with previously stored user credentials 238 (Operation 320). Where the authentication application 216 determines that the user 104 is not authenticated (e.g., the "NO" branch of Operation 320), the method 302 proceeds to Operation 322. At Operation 322, the authentication application 216 instructs the operating system 214 to deny the user 104 access to the computing device 106. The method 302 then ends and the user 104 may be prompted to re-authenticate himself or herself to the computing device 106.

Alternatively, where the user 104 is authenticated (e.g., the "YES" branch of Operation 320), the computing device 106 then performs several operations in preparing to store one or more of the acquired image(s) 222 as the one or more transient image template(s) 228. First, the authentication application 216 and/or facial recognition application 218 may determine whether one or more of the acquired image(s) 222 are of a requisite quality to become a transient image template. Otherwise, if the acquired image(s) 222 are not of the requisite quality, then it is likely that the user will be unable to authenticate himself or herself in future attempts where the low-quality acquired image(s) 222 are the transient image template(s) 228.

As discussed above, the authentication application 216 and/or the facial recognition application 218 determines various quality metrics of one or more of the acquired image(s) 222 (Operation 324). Examples of quality metrics include detected light levels (e.g., underexposure or overexposure), blurriness, whether one or more faces can be detected (e.g., object detection probability), and other such quality metrics or combinations thereof.

The authentication application 216 and/or the facial recognition application 218 then determines whether the determined and/or obtained quality metric values of the one or more acquired image(s) is within a predetermined range of acceptable quality metric values (e.g., at or above a lower threshold and at or below an upper threshold) (Operation 326). A range of quality metric values are used because, if one or more of the quality metrics are too high, such as an overexposure value, then the resulting image is likely overexposed and the image of the user 104 is likely obscured similarly, if one or more of the quality metrics value is too low (e.g., the object detection probability, detected ambient light levels, etc.), then the resulting image is likely underexposed and/or darkened, and the image of the user 104 is likely to be indeterminable from shadows or other dark markings. Accordingly, where the determination of Operation 326 is made in the negative (e.g., the "NO" branch of Operation 326), the method 302 proceeds to Operation 328. At Operation 328, the acquired image having the unacceptable ambient light value is deleted or discarded.

Alternatively, where this determination is made in the affirmative (e.g., the "YES" branch of Operation 326), the method 302 proceeds to Operation 330, where the authentication application 216 and/or the facial recognition application 218 generates the transient image template(s) 228 from the acquired image. Additionally and/or alternatively, the authentication application 216 and/or the facial recognition application 218 may also determine one or more features from the acquired image that are to be used in future attempts of image-based authentication of the user 104. The authentication application 216 and/or the facial recognition application 218 then associates timing data 236 with the one or more transient image template(s) 228 and/or determined features, where the timing data 236 includes a timer that indicates a duration of time that the transient image template(s) 228 is to remain on the computing device 106. As discussed above, at the expiration of the timer, the transient image template (or determined features) associated with the timer are deleted (or otherwise removed) from the computing device 106.

Figure 4A:
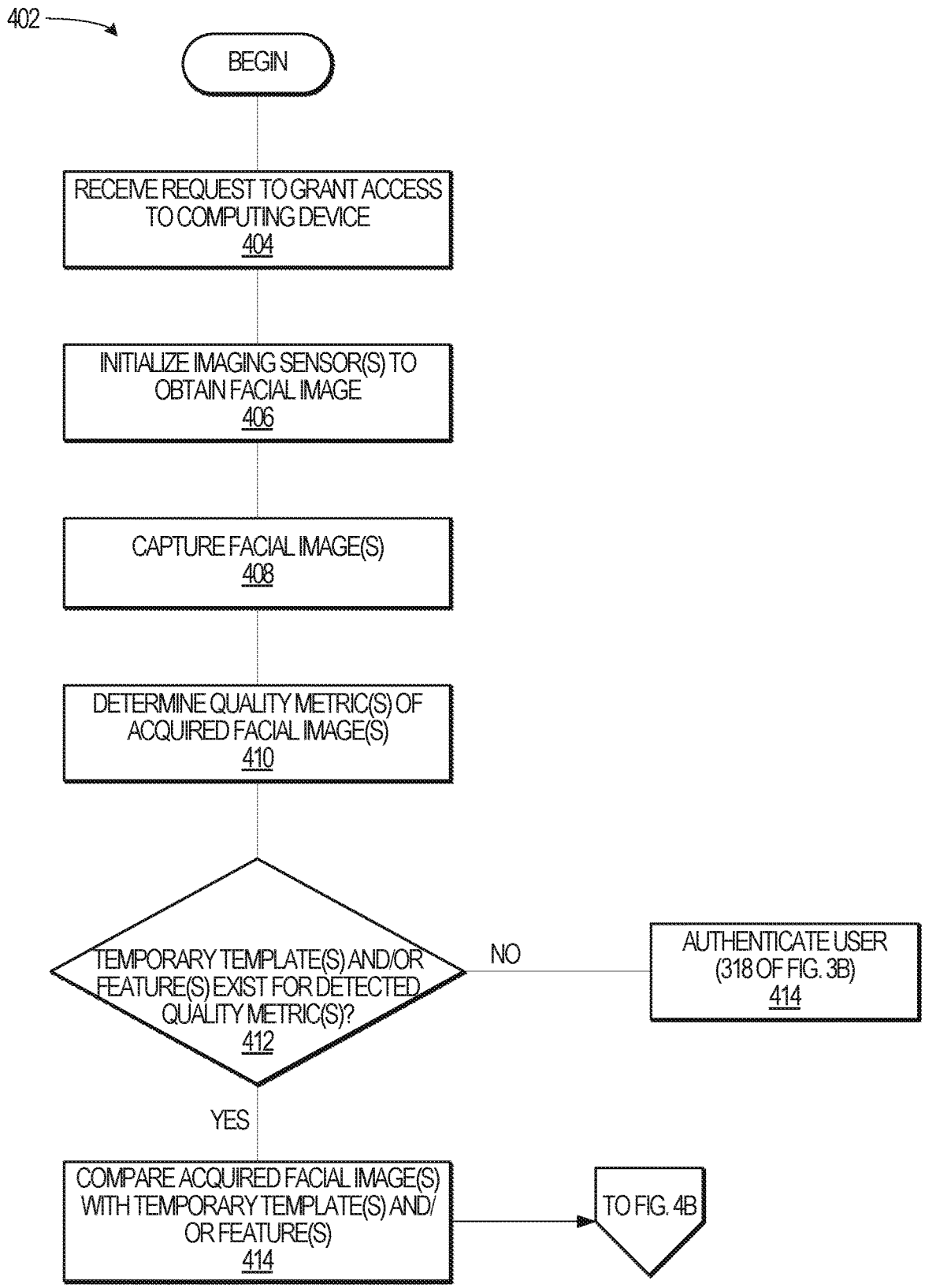
FIGS. 4A-4B illustrate a method, in accordance with an example embodiment, for authenticating the user to the computing device of FIG. 1 using one or more transient image templates.
Figure 4B:
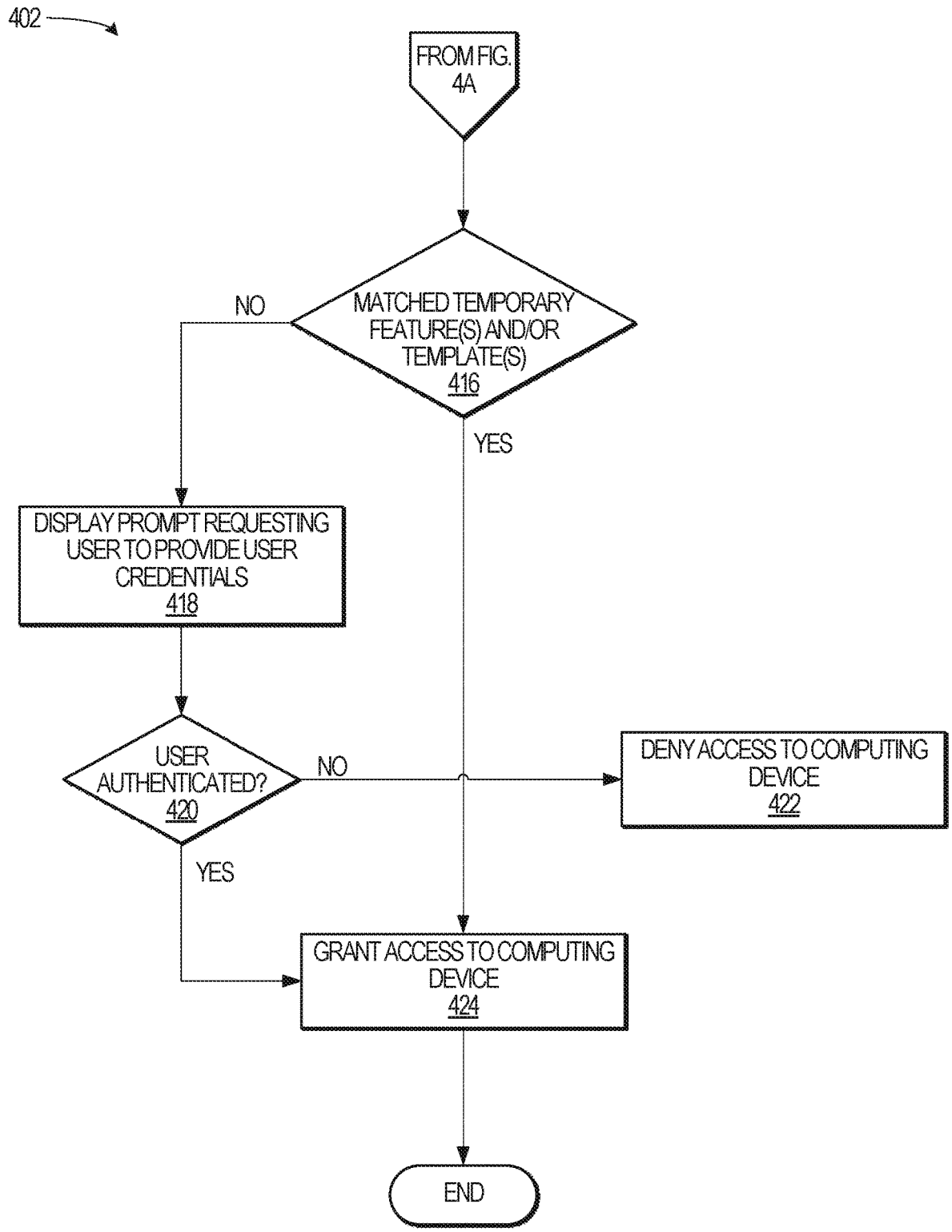

FIG. 4A-4B illustrate a method 402, in accordance with an example embodiment, for authenticating the user to the computing device of FIG. 1 using one or more transient image templates. The method 402 may be implemented by one or more of the components shown in FIG. 2 and is discussed by way of reference thereto. The method 402 illustrates the operations that the computing device 106 undertakes after one Initially, and with reference to FIGS. 2 and 4A, the computing device 106 receives, via the operating system 214, a request for access (Operation 404). The request for access may comprise a request to perform an image-based authentication of the user 104. The operating system 214 and/or the authentication application 216 then initializes one or more of the image sensor(s) 206 for acquiring one or more images of the user 104 (Operation 406). The image sensor(s) 206 then acquire the one or more images of the user 104 and store such image(s) as the acquired image(s) 222 (Operation 408). In some embodiments, the authentication application 216 and/or the facial recognition application 218 then determines one or more image feature(s) from the acquired image(s) 222 (operation not shown).

The facial recognition application 218 then determines various quality metric values of the acquired image(s) 222 (Operation 410). As explained previously, the method 402 relates to the situation where transient image template(s) 228 already exist; thus, the facial recognition application 218 determines the quality metric values of the acquired image(s) 222 to ensure that there are corresponding transient image template(s) 228 for such determined quality metric values. In one embodiment, one or more of the transient image template(s) 228 are selected for matching with the one or more acquired image(s) 222 where the quality metric values of the acquired image(s) 222 are equal to, or within a predetermined range of, the quality metric values for the corresponding transient image template(s) 222. Additionally and/or alternatively, the facial recognition application 218 may reject those acquired image(s) 222 where the quality metric values of the acquired image(s) 222 are outside of a predetermined range of the quality metric values associated with the transient image template(s) 228.

Where the facial recognition application 218 determines that there are no transient image template(s) 228 having quality metric values similar to the quality metric values of the acquired image(s) 222, (e.g., the "NO" branch of Operation 412), the method 402 proceeds to Operation 414, where the computing device 106 authenticates the user 104 using the secondary means of authentication (e.g., Operation 318 of FIG. 3B). Additionally and/or alternatively, the method 402 may proceed to Operation 308 so that the computing device 106 can perform those operations that establish the transient image template(s) 228.

Alternatively, where the facial recognition application 218 determines that there are corresponding transient image template(s) 228 (e.g., the "YES" branch of Operation 412), the method 402 proceeds to Operation 414, where the facial recognition application 218 performs the template matching and/or feature matching operations described previously.

Referring to FIG. 4B, the facial recognition application 218 determines whether there are matching transient image template(s) 228 and/or transient features for the acquired image(s) 222 and/or determined image features of the acquired image(s) 222. Where the facial recognition application 218 determines that there is a match for at least one transient image template 228 and at least one of the acquired image(s) 222, (or a match between transient features and determined features) (e.g., the "YES" branch of Operation 416), the method 402 proceeds to Operation 424, where the facial recognition application 218 instructs or informs the authentication application 216 that the user 104 is authenticated. Accordingly, at Operation 424, the user 104 is granted access to the computing device 106.

Alternatively, where the facial recognition application 218 determines that there is not a sufficient match of at least one acquired image and at least one of the transient image template(s) 228 (e.g., the "NO" branch of Operation 416), the facial recognition application 218 informs the authentication application 216 of the failure. Accordingly, the authentication application 216 may then instruct the operating system 214 to display a prompt requesting that the user 104 provide one or more user credentials. When provided with the user credentials, the authentication application 216 then determines whether the user 104 is authenticated (e.g., by comparing the provided credentials with the user credentials 238) (Operation 420). Where the authentication application 216 determines that the user 104 is not authenticated (e.g., the "NO" branch of Operation 420), the method 402 proceeds to Operation 422, where the authentication application 216 and/or the operating system 214 denies the user 104 access to the computing device 106. In one embodiment, the computing device 106 then begins the authentication anew and requests that the user 104 authenticate himself or herself to the computing device 106.

Alternatively, where the authentication application 216 determines that the user 104 is authenticated (e.g., the "YES" branch of Operation 420), the method 402 proceeds to Operation 424, where the authentication application 216 instructs and/or informs the operating system 214 that the user 104 is authorized to use the computing device 106.

Figure 5A:
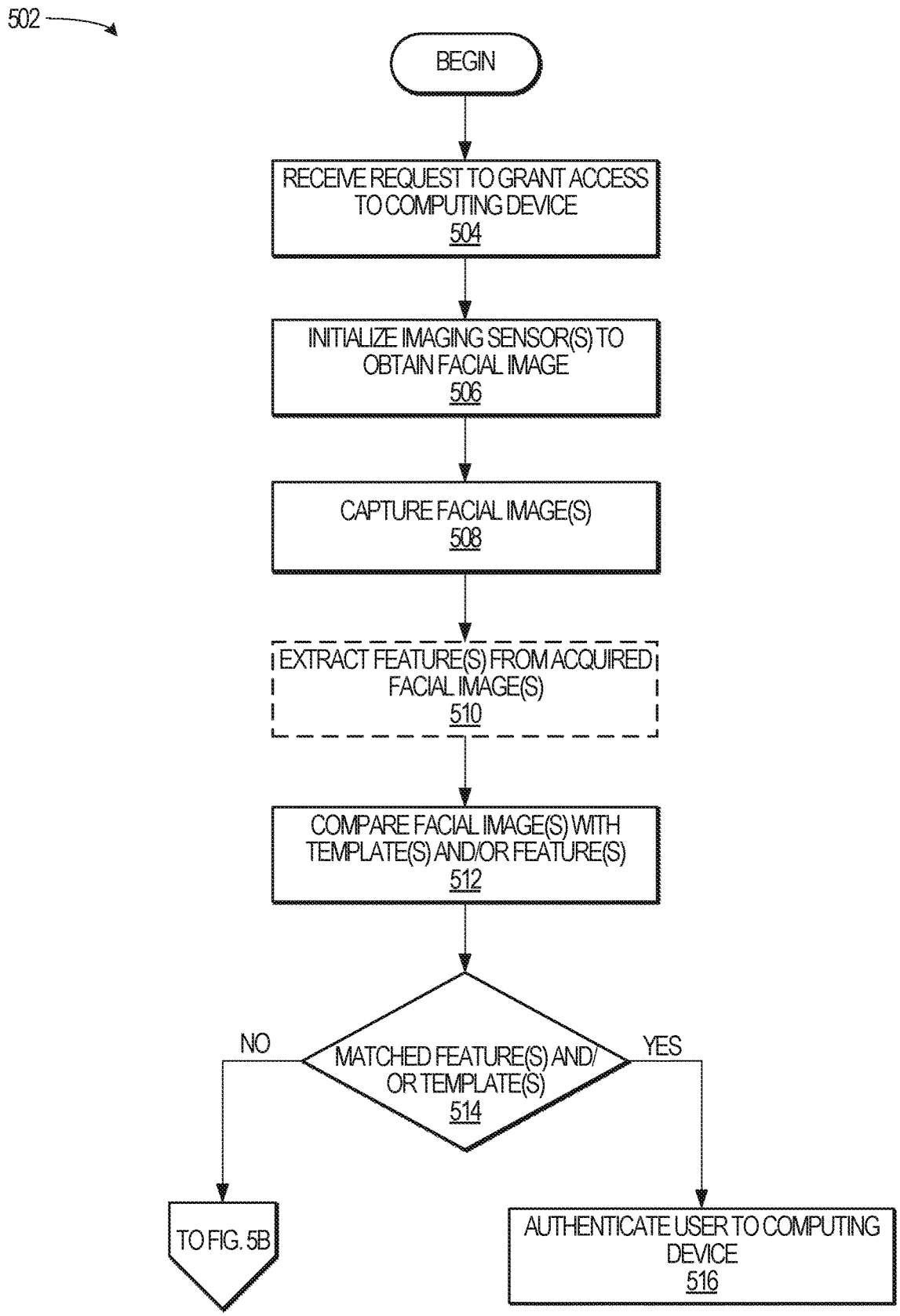
FIGS. 5A-5B illustrate a method, in accordance with an example embodiment, for generating transient image template(s) from acquired image(s), where the transient image template(s) are to be associated with a corresponding authenticated location.
Figure 5B:
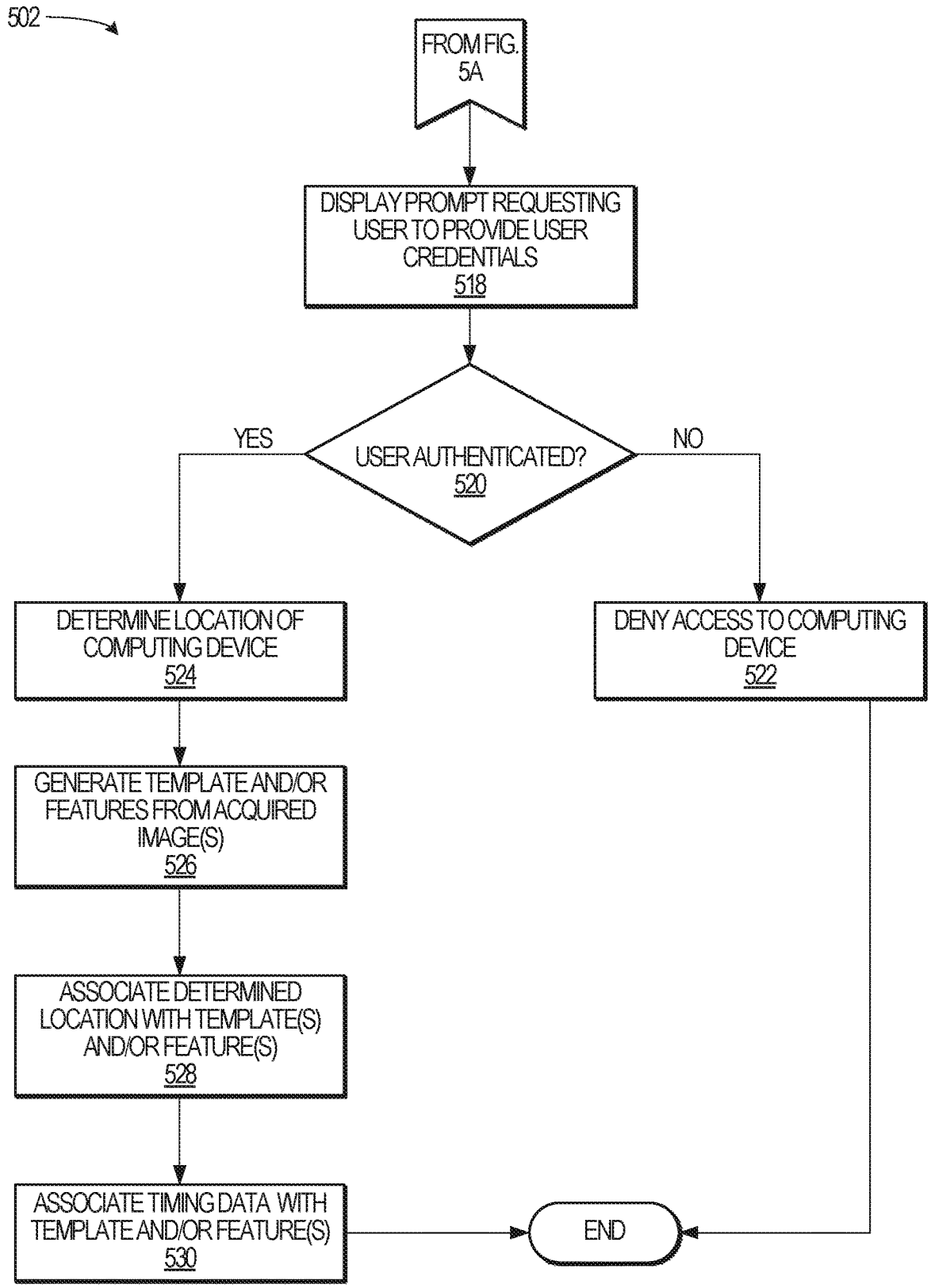

FIG. 5A-5B illustrate a method 502, in accordance with an example embodiment, for generating transient image template(s) 228 from acquired image(s) 222, where the transient image template(s) 228 are to be associated with a corresponding authenticated location. The method 502 may be performed by one or more of the components illustrated in FIG. 2 and is discussed by way of reference thereto.

Initially, and with reference to FIGS. 2 and 5A, the computing device 106 receives, via the operating system 214, a request for access (Operation 504). The request for access may comprise a request to perform an image-based authentication of the user 104. The operating system 214 and/or the authentication application 216 then initializes one or more of the image sensor(s) 206 for acquiring one or more images of the user 104 (Operation 506). The image sensor(s) 206 then acquire the one or more images of the user 104 and store such image(s) as the acquired image(s) 222 (Operation 508). In some embodiments, the authentication application 216 and/or the facial recognition application 218 then determines one or more image feature(s) from the acquired image(s) 222 (Operation 510). Although shown as an optional operation, the Operation 510 may be performed alternatively and/or additionally to one or more of the operations shown in FIG. 5A.

The facial recognition application 218 then compares the acquired image(s) 222 with one or more of the baseline image template(s) 226 (Operation 512). As discussed above, the image template matching operations may include, but are not limited to, sum of squared difference, normalized sum of square differences, cross-correlation, normalized cross-correlation, correlation-coefficient, and other such template matching techniques or combinations thereof. Additionally and/or alternatively, the facial recognition application 218 performs one or more feature matching operations using baseline image feature(s) 232 and one or more features determined from the acquired image(s) 222 (Operation 512).

The facial recognition application 218 then informs or communicates an instruction to the authentication application 216 whether the one or more acquired image(s) 222 match the baseline image template(s) 226 (Operation 514). Where this determination is made in the affirmative (e.g., the "YES" branch of Operation 514), the method 502 proceeds to Operation 516 where the authentication application 216 confirms that the user 104 is authorized to access the computing device 106. Alternatively, where this determination is made in the negative (e.g., the "NO" branch of Operation 514), the method 302 proceeds to Operation 518 on FIG. 5B.

Referring to FIG. 5B, at Operation 518 the computing device 106, via the operating system 214, displays a prompt to the user 104 requesting that the user 104 authenticate himself or herself using a second means of authentication. For example, the operating system 214 may display a prompt requesting that the user 104 provide one or more user credentials, such as a PIN, secret pattern, username and password, fingerprint, or other such user credentials.

The provided user credentials are then compared with previously stored user credentials 238 (Operation 520). Where the authentication application 216 determines that the user 104 is not authenticated (e.g., the "NO" branch of Operation 520), the method 502 proceeds to Operation 522. At Operation 522, the authentication application 216 instructs the operating system 214 to deny the user 104 access to the computing device 106. The method 502 then ends and the user 104 may be prompted to re-authenticate himself or herself to the computing device 106.

Alternatively, where the user 104 is authenticated (e.g., the "YES" branch of Operation 520), the computing device 106 then performs several operations in preparing to store one or more of the acquired image(s) 222 as the one or more transient image template(s) 228. First, the authentication application 216 and/or facial recognition application 218 may determine a location of the computing device 106 (Operation 524). In one embodiment, the authentication application 216 and/or the facial recognition application 218 queries the GPS transceiver 208 to obtain a GPS location 224 of the computing device 106. However, and as explained previously, the location of the computing device 106 may be determined according to other technologies, such as cellular triangulation, IP address geolocation, WiPS/WFPS, and other such technologies or combinations thereof.

As the user 104 has authenticated himself or herself, this indicates to the authentication application 216 and/or facial recognition application 218 that the GPS location 224 (or location determined using other geolocation technologies) of the computing device 106 is a trusted location. Accordingly, the authentication application 216 and/or the facial recognition application 218 may store the GPS location 224 as an authenticated GPS location 230.

In addition, and as discussed with reference to FIGS. 3A-3B, the facial recognition application 218 may determine whether the acquired image(s) are sufficient for performing the matching and/or comparison operations including, but not limited to, determining ambient light levels in the acquired image(s), determining blurriness of the acquired image(s), determining color levels in the acquired image(s) (e.g., through a histogram analysis), and other such determinations. Accordingly, in this manner, the facial recognition application 218 determines whether the acquired image(s) 222 have a requisite quality for performing image-based authentication.

Based on whether one or more of the acquired image(s) 222 is sufficient for performing image-based authentication, the authentication application 216 and/or the facial recognition application 218 may then generate a transient image template 228 and/or transient image features from the one or more acquired image(s) 222 (Operation 526). Thereafter, the authentication application 216 and/or the facial recognition application 218 then establishes an association between the authenticated GPS location 230 and the transient image template 228, such as by storing the association in a two-dimensional table or other relational database (not shown). In addition, and in similar manner to the method 302, the authentication application 216 and/or the facial recognition application 218 then associates timing data 236 with the one or more transient image template(s) 228 and/or determined features, where the timing data 236 includes a timer that indicates a duration of time that the transient image template(s) 228 is to remain on the computing device 106. As discussed above, at the expiration of the timer, the transient image template (or determined features) associated with the timer are deleted (or otherwise removed) from the computing device 106.

Thus, in addition to including timing data 236 with one or more of the transient image template(s) 228, the authentication application 216 and/or the facial recognition application 218 also associates an authenticated GPS location 230 with one or more of the transient image template(s) 228. Accordingly, each of the transient image template(s) 228 may be associated with an authenticated GPS location 230 and timing data 236. These associations further improve the functioning of the computing device 106 because they allow the computing device 106 to authenticate the user 104 based both on time (e.g., whether the timer associated with a transient image template 228 has expired) and on location (e.g., whether the computing device 106 is located at a location that the user 104 has previously authenticated).

Figure 6A:
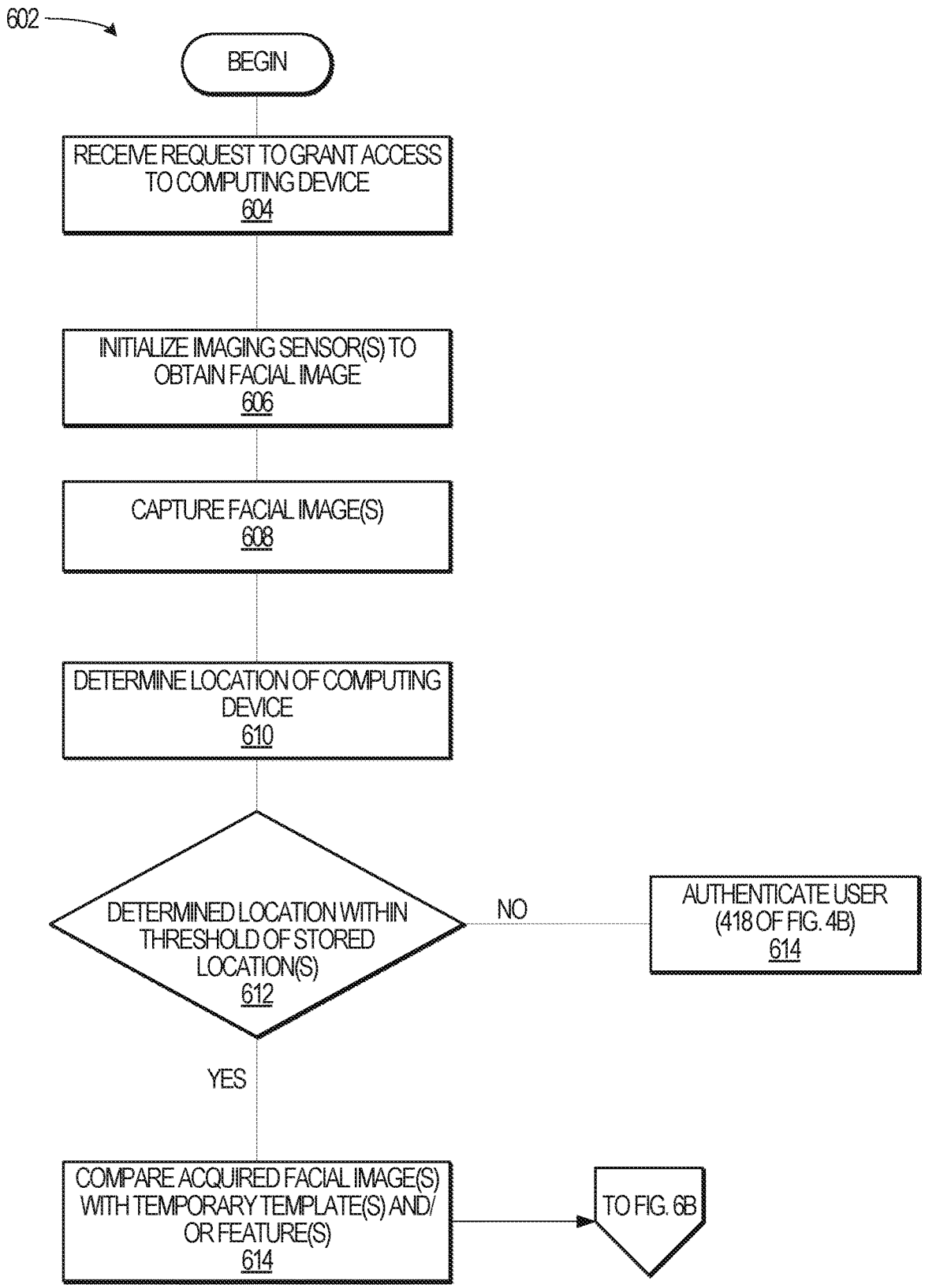
FIGS. 6A-6B illustrate a method, in accordance with an example embodiment, for authenticating the user to the computing device of FIG. 1 using one or more transient image template(s) and authenticated GPS location(s).
Figure 6B:
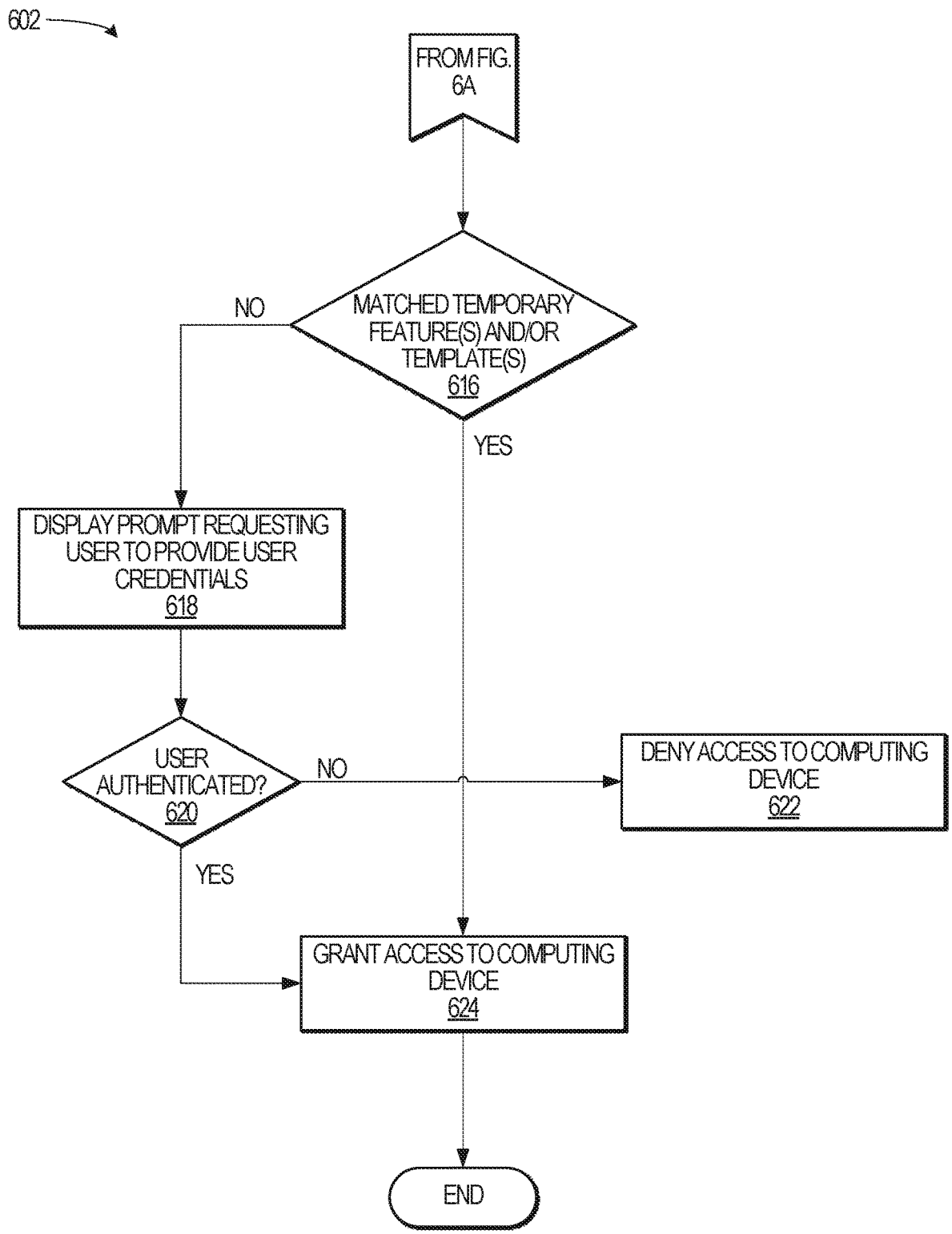

FIG. 6A-6B illustrate a method 602, in accordance with an example embodiment, for authenticating the user 104 to the computing device 106 using one or more transient image template(s) 228 and the authenticated GPS location(s) 230. The method 602 may be implemented by one or more of the components shown in FIG. 2 and is discussed by way of reference thereto.

Initially, and with reference to FIGS. 2 and 6A, the computing device 106 receives, via the operating system 214, a request for access (Operation 604). The request for access may comprise a request to perform an image-based authentication of the user 104. The operating system 214 and/or the authentication application 216 then initializes one or more of the image sensor(s) 206 for acquiring one or more images of the user 104 (Operation 606). The image sensor(s) 206 then acquire the one or more images of the user 104 and store such image(s) as the acquired image(s) 222 (Operation 608). In some embodiments, the authentication application 216 and/or the facial recognition application 218 then determines one or more image feature(s) from the acquired image(s) 222 (operation not shown).

The authentication application 216 and/or the facial recognition application 218 then determines the location of the computing device 106 (Operation 610). In one embodiment, the GPS transceiver 208 provides the GPS location 224 of the computing device 106. As explained previously, the method 602 relates to the situation where transient image template(s) 228 already exist and are associated with one or more authenticated GPS location(s) 230; thus, the authentication application 216 and/or the facial recognition application 218 obtains the location of the computing device 106 to determine whether there is a corresponding transient image template associated with a GPS location equal to, or approximately equal to, the GPS location 224 of the computing device 106.

Accordingly, using the GPS location 224, the authentication application 216 and/or the facial recognition application 218 determines whether there is an authenticated GPS location 230 approximate, or near, the GPS location 224. In one embodiment, the computing device 106 is programmed with a distance threshold, which indicates a threshold distance in which the GPS location 224 should be at or within to an authenticated GPS location 230 to be considered at or near the authenticated GPS location 230. Where the authentication application 216 and/or the facial recognition application 218 is unable to identify a corresponding authenticated GPS location (e.g., the "NO" branch of Operation 612), the method 602 proceeds to Operation 614. At Operation 614, the computing device 106 authenticates the user 104 using the secondary means of authentication (e.g., Operation 518 of FIG. 5B). Additionally, and/or alternatively, the method 402 may proceed to Operation 508 so that the computing device 106 can perform those operations that establish the transient image template(s) 228 and the associations between the transient image template(s) and the authenticated GPS location(s) 230.

Alternatively, where the authentication application 216 and/or the facial recognition application 218 determines that there are one or more authenticated GPS location(s) 230 corresponding to the GPS location 224 (e.g., the "YES" branch of Operation 612), the method 602 proceeds to Operation 614. At Operation 614, the facial recognition application 218 references the template/GPS associations 234 using the determined authenticated GPS location(s) 230 of Operation 612 to identify the corresponding transient image template(s) 228. Using the corresponding transient image template(s) 228, the facial recognition application 218 then compares the corresponding transient image template(s) with the one or more acquired image(s) 222.

Referring to FIG. 6B, the facial recognition application 218 determines whether there are matching transient image template(s) 228 and/or transient features for the acquired image(s) 222 and/or determined image features of the acquired image(s) 222 (Operation 616). Where the facial recognition application 218 determines that there is a match for at least one transient image template 228 and at least one of the acquired image(s) 222, (or a match between transient features and determined features) (e.g., the "YES" branch of Operation 616), the method 602 proceeds to Operation 624, where the facial recognition application 218 instructs or informs the authentication application 216 that the user 104 is authenticated. Accordingly, at Operation 624, the user 104 is granted access to the computing device 106.

Alternatively, where the facial recognition application 218 determines that there is not a sufficient match of at least one acquired image and at least one of the transient image template(s) 228 (e.g., the "NO" branch of Operation 616), the facial recognition application 218 informs the authentication application 216 of the failure. Accordingly, the authentication application 216 may then instruct the operating system 214 to display a prompt requesting that the user 104 provide one or more user credentials. When provided with the user credentials, the authentication application 216 then determines whether the user 104 is authenticated (e.g., by comparing the provided credentials with the user credentials 238) (Operation 620). Where the authentication application 216 determines that the user 104 is not authenticated (e.g., the "NO" branch of Operation 620), the method 602 proceeds to Operation 622, where the authentication application 216 and/or the operating system 214 denies the user 104 access to the computing device 106. In one embodiment, the computing device 106 then begins the authentication anew and requests that the user 104 authenticate himself or herself to the computing device 106.

Alternatively, where the authentication application 216 determines that the user 104 is authenticated (e.g., the "YES" branch of Operation 620), the method 602 proceeds to Operation 624, where the authentication application 216 instructs and/or informs the operating system 214 that the user 104 is authorized to use the computing device 106.

Figure 7A:
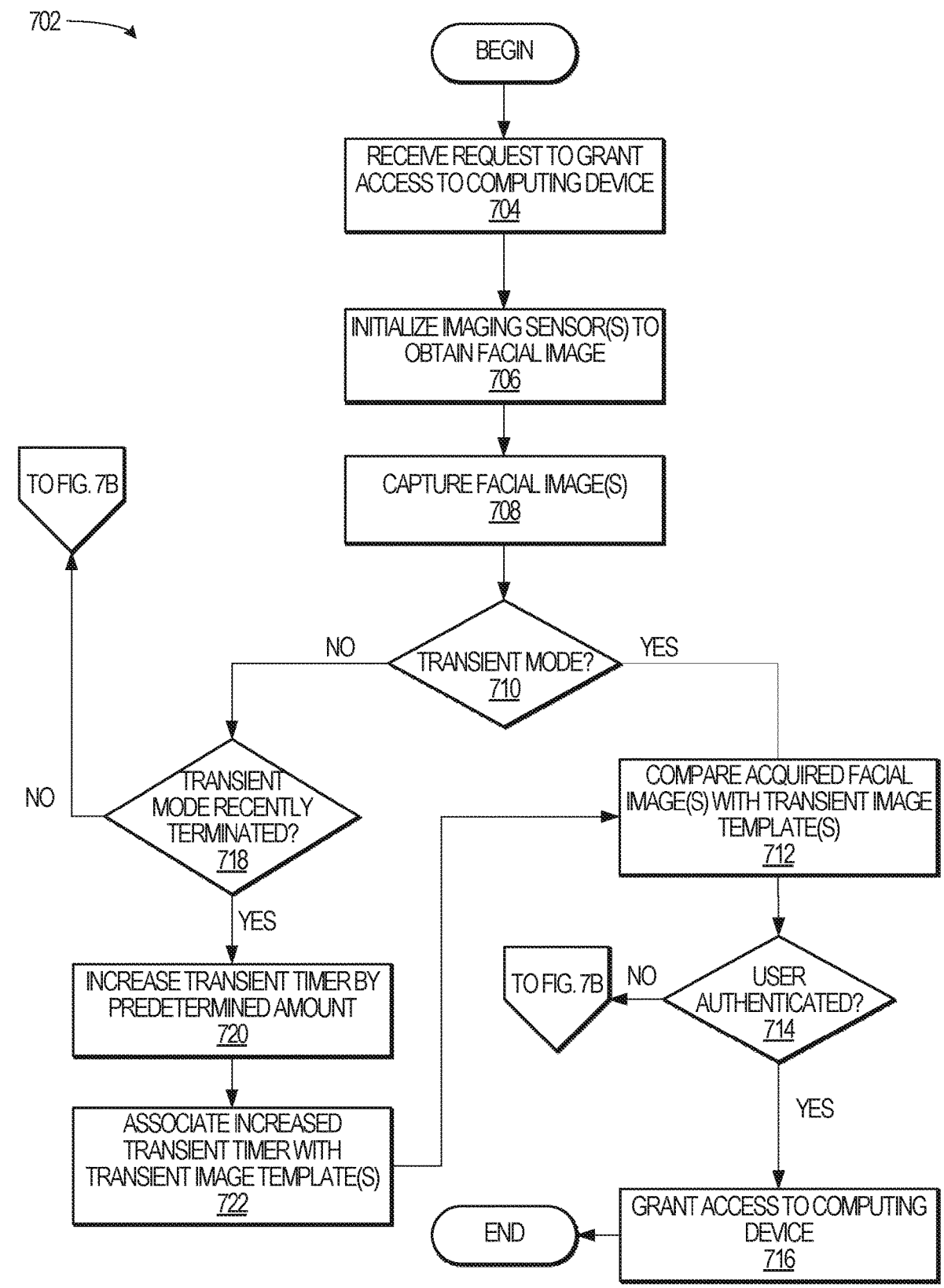
FIGS. 7A-7C illustrate a method, in accordance with an example embodiment, for incrementally increasing a transient time window in response to a determination that a transient image template was recently used.
Figure 7B:
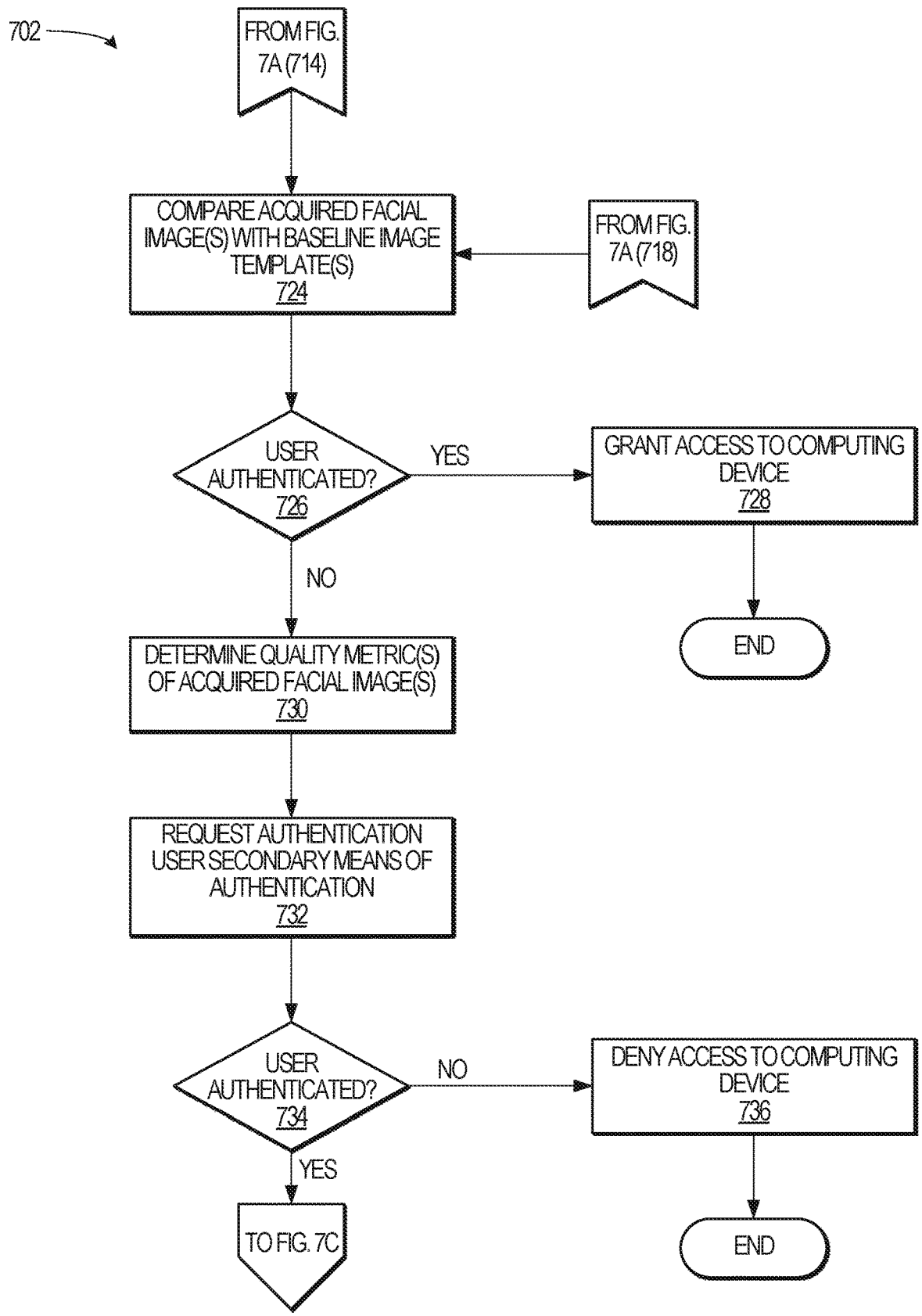
Figure 7C:
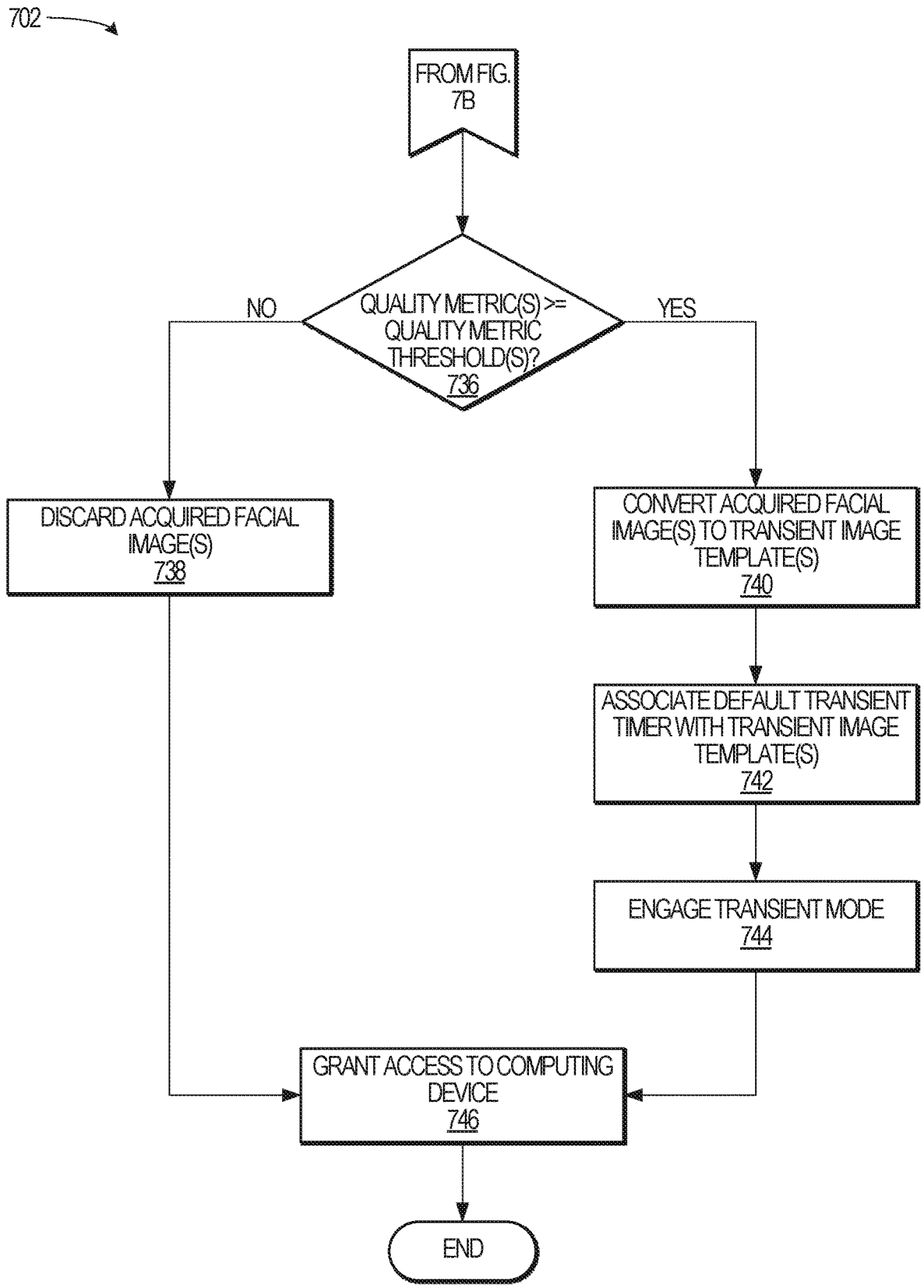

FIGS. 7A-7C illustrate a method 702, in accordance with an example embodiment, for extending the time of the transient mode of operation for the computing device 106 based on a determination that the computing device 106 was recently operating in the transient mode. The method 702 may be implemented by one or more components of FIG. 2 and is discussed by way of reference thereto.

Initially, and with reference to FIGS. 2 and 7A, the computing device 106 receives, via the operating system 214, a request for access (Operation 704). The request for access may comprise a request to perform an image-based authentication of the user 104. The operating system 214 and/or the authentication application 216 then initializes one or more of the image sensor(s) 206 for acquiring one or more images of the user 104 (Operation 706). The image sensor(s) 206 then acquires the one or more images of the user 104 and store such image(s) as the acquired image(s) 222 (Operation 708). In some embodiments, the authentication application 216 and/or the facial recognition application 218 then determines one or more image feature(s) from the acquired image(s) 222 (operation not shown).

The authentication application 216 and/or the facial recognition application 218 then determines whether the computing device 106 is operating in a transient mode (Operation 710). In one embodiment, determining whether the computing device 106 is operating in the transient mode comprises determining the location of the computing device 106, determining that the determined location is stored in the template/GPS associations 234, identifying the transient image template 228 associated with the determined location, and referencing a transient timer associated with identified transient image template. Where the transient timer has not expired, the authentication application 216 and/or the facial recognition application 218 determines that the computing device 106 is operating in the transient mode (e.g., the "YES" branch of Operation 710). In another embodiment, a flag, Boolean variable, or other identifier is used to identify whether the computing device 106 is operating in a baseline or transient operating mode, and the flag, Boolean variable, or other identifier is modified when a transient timer is established and/or when a transient timer expires. Accordingly, the flag, Boolean variable, or other identifier may identify that the computing device 106 is operating in the transient mode (e.g., the "YES" branch of Operation 710).

Where the computing device 106 affirmatively determines that it is operating in the transient mode, the method 702 proceeds to Operation 712. At Operation 712, one or more of the acquired image(s) 222 are compared with one or more of the transient image template(s) 228. As discussed previously, the comparison may also be location dependent, such that the facial recognition application 218 and/or the authentication application 216 determines which transient image template(s) 228 to use in the comparison based on the location of the computing device 106 (e.g., as provided by one or more of the wireless transceivers 212). Furthermore, and while not shown FIG. 7A, the comparison of the acquired image(s) 222 may include a comparison of image features determined from the acquired image(s) 222 with one or more transient image features.

Based on the comparison of the one or more acquired image(s) 222 with the one or more transient image template(s) 228, the authentication application 216 and/or the facial recognition application 218 determines whether the user 104 is authenticated (Operation 714). As discussed previously, the authentication application 216 and/or the facial recognition application 218 may use various metrics to determine whether one or more of the acquired image(s) 222 match with the one or more transient image template(s) 228, such as squared difference, normalized sum of square differences, cross-correlation, normalized cross-correlation, correlation-coefficient, and other such template matching techniques or combinations thereof.

Where the metrics indicate a match (e.g., the resulting match value is greater than or equal to a predetermined threshold), the authentication application 216 and/or the facial recognition application 218 informs the operating system 214 that the user 104 is authorized to use the computing device 106 (Operation 716).

Alternatively, the authentication application 216 and/or the facial recognition application 218 may determine that there is not a match between the one or more acquired image(s) 222 with the one or more transient image template(s) 228 (e.g., the "NO" branch of Operation 714). Accordingly, the method 702 proceeds to Operation 724 on FIG. 7B. Operation 724 and onwards is discussed further below after the following description relating to Operations 718-722.

Referring back to Operation 710, the authentication application 216 and/or the facial recognition application 218 may determine that the computing device 106 is not operating in a transient mode (e.g., the "NO" branch of Operation 710). As discussed previously, this determination may be performed by referencing one or more transient timers associated with one or more transient image template(s) 228 and/or by referencing a transient flag previously set by the authentication application 216 and/or the facial recognition application 218. Where the authentication application 216 and/or the facial recognition 218 determines that the computing device 106 is not operating in the transient mode, the method 702 proceeds to Operation 718.

At Operation 718, the authentication application 216 and/or the facial recognition application 218 determines whether the computing device 106 recently terminated or exited from the transient mode (Operation 718). In one embodiment, the authentication application 216 and/or the facial recognition application 218 performs this determination by referencing a transient timestamp associated with one or more of the transient image template(s) 228 and/or one or more of the authenticated GPS location(s) 230. The authentication application 216 and/or the facial recognition application 218 may compute a difference between the transient timestamp and a current time to obtain a transient mode time difference, which is then compared with the transient mode threshold. In this manner, determining whether the computing device 106 recently terminated or exited from the transient mode may be based on a particular transient image template 228, a particular location, or a combination thereof.

Where the authentication application 216 and/or the facial recognition application 218 determines that the computing device 106 did not recently terminate its transient mode (e.g., the "NO" branch of Operation 718), the method 702 proceeds to Operation 724 on FIG. 7B. Alternatively, where the authentication application 216 and/or the facial recognition application 218 affirmatively makes this determination (e.g., the "YES" branch of Operation 718), the method 702 proceeds to Operation 720.

At Operation 720, the authentication application 216 and/or the facial recognition application 218 increases a transient timer associated with one or more of the transient image template(s) 228. In one embodiment, the increase to the transient timer is the transient timer associated with the most recent termination of transient mode. In another embodiment, the increase is applied to a transient timer associated with a location for where the computing device 106 (e.g., a location stored in the authenticated GPS location(s) 230). As discussed above, the increase may be for a predetermined amount (e.g., programmed within the operating system 214) or may be configurable by the user 104 through one or more user interfaces provided by the operating system 214. The increased transient timer is then associated with one or more of the transient image template(s) 228 (Operation 722). The method 702 then proceeds to Operation 712 where, as discussed above, the authentication application 216 and/or the facial recognition application 218 performs a comparison of one or more of the acquired image(s) 222 with one or more of the transient image template(s) 228.

Referring to FIG. 7B, the method 702 enters Operation 724 from either Operation 714 or Operation 718 of FIG. 7A. At Operation 724, the authentication application 216 and/or the facial recognition application 218 compares one or more of the acquired image(s) 222 with one or more of the baseline image template(s) 226. Operation 724 is performed under the presumption that, even though the one or more acquired image(s) 222 may not have been a match for one or more of the transient image template(s) 228, the one or more acquired image(s) 222 may still be a match for one or more of the baseline image template(s) 226. Thus, the benefit of incorporating this Operation is that the computing device 106 ensures that both baseline image template(s) 226 and transient image template(s) 228 are used in the authentication process, which increases the likelihood that one or more of the acquired image(s) 222 will authenticate the user 104.

At Operation 726, the authentication application 216 and/or the facial recognition application 218 determines whether the user 104 is authenticated. As discussed above, the authentication application 216 and/or the facial recognition application 218 may determine that the user 104 is authenticated when the value returned from one or more of the template matching technique meets or exceeds a predetermined matching threshold value. Where the authentication application 216 and/or the facial recognition application 218 determines that the user 104 is authenticated (e.g., the "YES" branch of Operation 726), the method 702 proceeds to Operation 728, where the user 104 is granted access to the computing device 106.

Alternatively, where the authentication application 216 and/or the facial recognition application 218 determines that the user 104 is not authenticated (e.g., the "NO" branch of Operation 726), the method 702 proceeds to Operation 730. At Operation 730, the authentication application 216 and/or the facial recognition application 218 determines one or more quality metric values for one or more of the acquired image(s) 222. The authentication application 216 and/or the facial recognition application 218 performs this determination in anticipation that the user 104 is successful in authenticating himself or herself using a secondary means of authentication, and that one or more of the acquired image(s) 222 should be converted to a transient image template 228.

Accordingly, at Operation 732, the authentication application 216 and/or the facial recognition application 218 instructs the operating system 214 to display a prompt or message requesting that the user 104 authenticate himself or herself using a secondary means of authentication. As discussed previously, secondary means of authentication include, but are not limited to a PIN, a secret pattern, a password, a fingerprint, a retina scan, or any other biometric or non-biometric means of authenticating the user 104.

At Operation 734, the authentication application 216 determines whether the user 104 is authenticated based on the secondary means of authentication. In one embodiment, the authentication application 216 compares the credentials received from the user 104 using the secondary means of authentication with the user credentials 238. Where the authentication application 216 determines that the user is not authenticated (e.g., the "NO" branch of Operation 734), the method 702 proceeds to Operation 736, where the authentication application 216 informs the operating system 214 to deny the user 104 access to the computing device 106.

Alternatively, where the authentication application 216 determines that the user 104 is authenticated (e.g., the "YES" branch of Operation 734), the method 702 proceeds to Operation 736 on FIG. 7C. Referring to FIG. 7C, the authentication application 216 and/or the facial recognition application 218 then determines whether one or more of the quality metrics determined in Operation 730 meet or exceed one or more quality metrics thresholds (Operation 736).

The authentication application 216 and/or the facial recognition application 218 performs this determination to ensure that the one or more acquired image(s) 222, which are to be converted to one or more transient image template(s) 238, have a requisite quality for use in subsequent image-based authentication attempts. In one embodiment, the authentication application 216 and/or the facial recognition application 218 performs this determination by comparing each of the one or more quality metrics with their corresponding thresholds. In some instances, an acquired image is determined to have the requisite quality when at least one quality metric meets or exceeds its corresponding threshold. In other instances, an acquired image is determined to have the requisite quality when all of the quality metrics meet or exceed their corresponding thresholds. The quality metric thresholds may also include ranges of values such that a quality metric should be within the range of values for the acquired image to be converted to a transient image template.

Accordingly, where the authentication application 216 and/or the facial recognition application 218 determines that the one or more acquired image(s) 222 do not have the requisite quality for use as a transient image template (e.g., the "NO" branch of Operation 736), the method 702 proceeds to Operation 738, where the one or more acquired image(s) 222 are deleted or discarded. Alternatively, where the authentication application 216 and/or the facial recognition application 218 determines that the one or more acquired image(s) 222 have the requisite quality (e.g., the "YES" branch of Operation 736), the method 702 proceeds to Operation 740.

At Operation 740, the authentication application 216 and/or the facial recognition application 218 converts one or more of the acquired image(s) 222 to one or more transient image template(s) 228. Thereafter, the authentication application 216 and/or the facial recognition application 218 assigns a default transient timer value to a transient timer associated with the newly converted transient image template (Operation 742). Alternatively, the authentication application 216 and/or the facial recognition application 218 may assign a transient timer having a value equal to the default transient timer value increased by an predetermined incremental amount. In addition, the authentication application 216 and/or the facial recognition application 218 may associate one or more authenticated GPS locations 230 with the newly converted transient image template.

With the transient timer associated with the newly converted transient image template, the computing device 106 may be considered to be operating in its transient mode. However, in some embodiments, the authentication application 216 and/or the facial recognition application 218 may assign a value to a transient mode flag that identifies that the computing device 106 is operating in its transient mode (Operation 744).

Referring back to Operation 736, whether the one or more acquired image(s), the authentication application 216 and/or the facial recognition application 218 informs the operating system 214 to grant the user 104 access to the computing device (Operation 746). The user 104 may then use the computing device 106.

Figure 8:
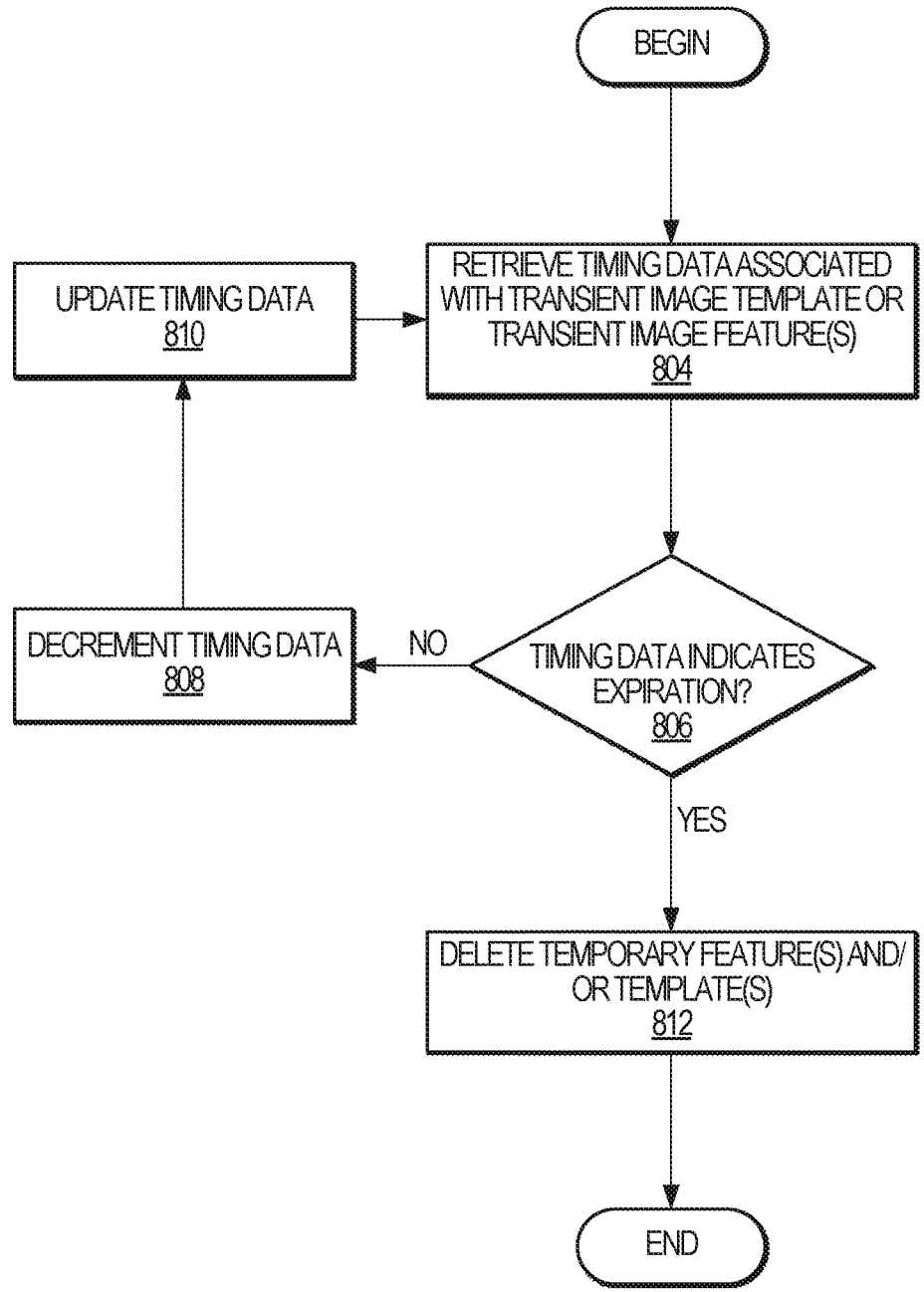
FIG. 8 illustrates a method, in accordance with an example embodiment, of implementing a timer for the transient image template(s) of the computing device of FIG. 1.

FIG. 8 illustrates a method 802, in accordance with an example embodiment, for updating the timing data for one or more transient image templates. The method 802 may be implemented by one or more of the components shown in FIG. 2 and is discussed by way of reference thereto.

Initially, the authentication application 216 retrieves timing data 236 associated with a transient image template 228 or one or more transient image features (Operation 804). In one embodiment, the timing data 236 comprises a timer that indicates the amount of remaining time a transient image template 228 or a transient image feature has before the authentication application 216 and/or facial recognition application 216 deletes the transient image template 228 or the transient image feature from the computing device 106. Alternatively, the timer may indicate the amount of time the transient image template 228 or the transient image feature has resided on the computing device 106.

The authentication application 216 and/or the facial recognition application 218 then determines whether the timing data 236 associated with the transient image template or the one or more transient image features has expired (Operation 806). In one embodiment, determining whether the timer has expired comprises determining whether the timer has reached a zero value. Alternatively, determining whether the timer has expired comprises comparing the timer with a predetermined timer threshold; where the timer meets or exceeds the predetermined timer threshold, the authentication application 216 and/or the facial recognition application 218 determines that the timer has expired.

Where the authentication application 216 and/or the facial recognition application 218 determines that the timing data 236 does not indicate that it has expired (e.g., the "NO" branch of Operation 806), the method 802 proceeds to Operation 808. At Operation 808, the authentication application 216 and/or the facial recognition application 218 adjusts the timing data 236; as shown in FIG. 8, adjusting the timing data 236 may include decrementing the timing data 236 by a predetermined amount (e.g., one second). In another embodiment, adjusting the timing data 236 may include incrementing the timing data 236 by the predetermined amount. The timing data 236 associated with the transient image template and/or one or more transient image features is then updated with the new decremented (or incremented) timing value (Operation 810). The method 802 then returns to Operation 804, where the method begins again.

Referring back to Operation 806, where the authentication application 216 and/or the facial recognition application 218 determines that the timing data 236 indicates that a timer associated with the transient image template and/or transient image features has expired (e.g., the "YES" branch of Operation 806), the method 802 proceeds to Operation 912. At Operation 812, the authentication application 216 and/or the facial recognition application 218 deletes, or otherwise removes, the transient image template or the one or more transient image features from the computing device 106. The method 802 may then end for that particular timing data.

Although some of the methods 302-802 reference the one or more acquired image(s) 222, the baseline image template(s) 226, and the one or more transient image template(s) 228, one of ordinary skill in the art will appreciate that the methods 302-802 may also be implemented using image features and one or more of the feature-based comparison operations previously discussed. In addition, while the methods 302-802 are shown independently, one of ordinary skill in the art will appreciate that the operations of methods 302-802 may be reordered and/or rearranged in various combinations, where duplicate or redundant Operations are omitted. Thus, the methods disclosed herein are not solely limited to their specific implementations as shown in FIGS. 3-8, but may be arranged or combined in any logical or operative fashion.

In this manner, this disclosure provides for various embodiments relating to image-based authentication of the user 104 and, in particular, to establishing a transient image template after an image-based authentication has failed but the user 104 has authenticated himself or herself using a second means of authentication. By using transient image templates and/or transient image features, the computing device 106 can perform image-based authentication in environments where image-based authentication consistently or typically fails with a baseline image template and/or baseline image features. In this regard, this disclosure provides for a technical improvement in the manner in which image-based authentication is conventionally performed; thus, the functioning and operations of the computing device 106 is improved over conventionally implemented computing devices.

Modules, Components, and Logic

Certain embodiments are described herein as including logic or a number of components, modules, or mechanisms. Modules may constitute either software modules (e.g., code embodied on a machine-readable medium or machine-readable storage device) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-8 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 9:
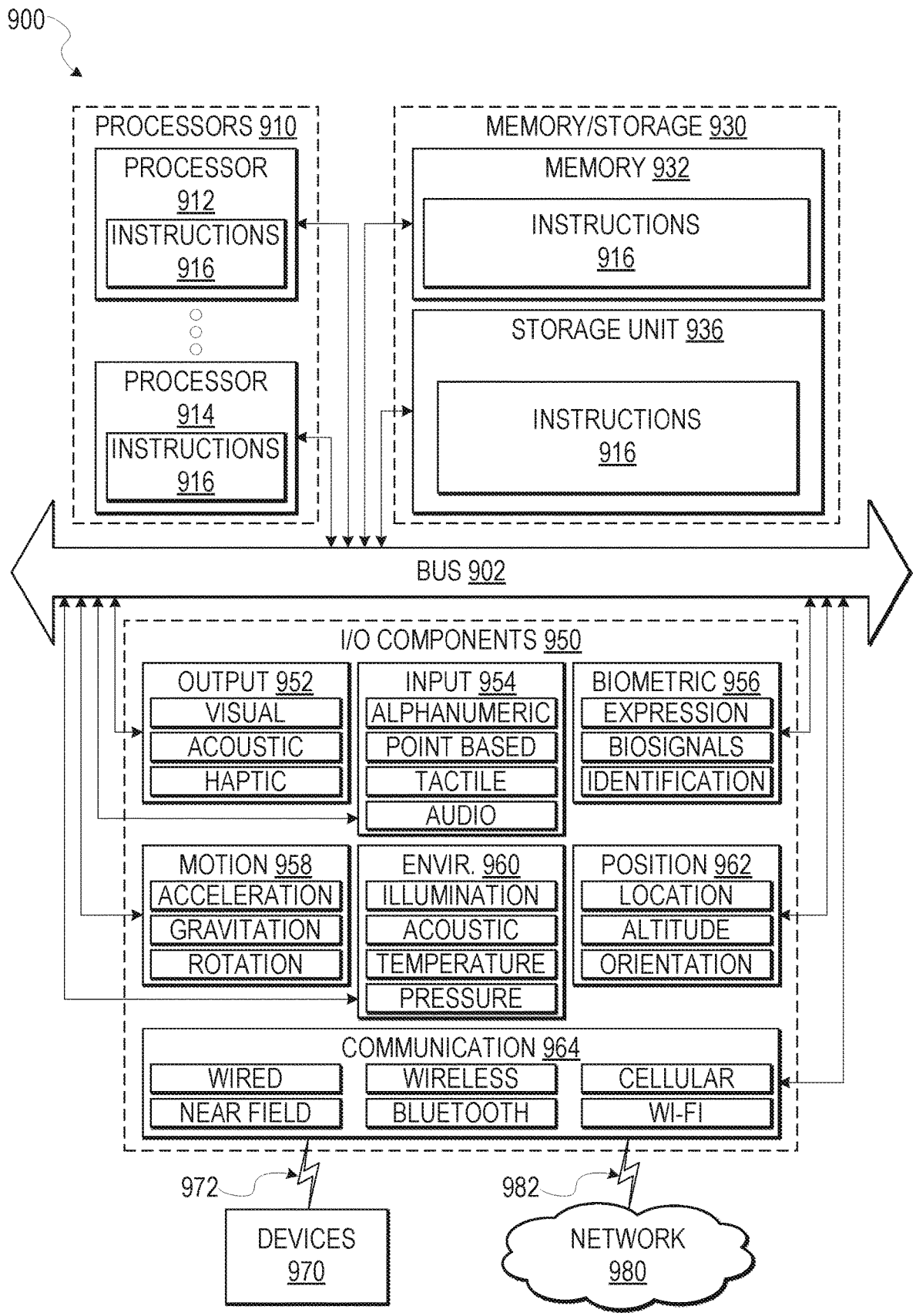
FIG. 9 is a block diagram illustrating components of a machine, according to some example embodiments, able to read instructions from a machine-readable medium (e.g., a machine-readable storage medium or machine-readable storage device) and perform any one or more of the methodologies discussed herein.

FIG. 9 is a block diagram illustrating components of a machine 900, according to some example embodiments, able to read instructions from a machine-readable medium (e.g., a machine-readable storage medium or machine-readable storage device) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the methods illustrated in FIGS. 3A-8. Additionally, or alternatively, the instructions 916 may implement one or more of the components of FIGS. 1-2. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a PDA, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 912 and processor 914 that may execute the instructions 916. The term "processor" is intended to include multi-core processor that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core process), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of processors 910 are examples of machine-readable media.

As used herein, "machine-readable medium" includes a machine-readable storage device able to store instructions 916 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 8. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972, respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A method for authenticating users using image recognition in noisy environments using at least one hardware processor, the method comprising:
   identifying a failed authentication attempt for a user, the failed authentication attempt identified in response to a comparison between a captured image of the user and a first image template;
   identifying a successful authentication attempt for the user, the successful authentication attempt occurring subsequent to the failed authentication attempt and using a credential of the user;
   in response to the successful authentication attempt, generating a second image template different than the first image template using the captured image, wherein the second image template is generated in response to identifying that the captured image meets a quality metric indicative of environmental conditions different than environment conditions for an image of the user obtained to generate the first image template;
   in response to generating the second image template, establishing an expiration time of a timer;
   subsequent to establishing the expiration time of the timer and prior to the timer reaching the expiration time, receiving a new authentication request for the user; and
   in response to identifying that the new authentication request occurred prior to the timer reaching the expiration time, using the second image template to authenticate the user.

2. The method of claim 1, further comprising:
   identifying that the timer has reached the expiration time; and
   deleting the second image template in response to the timer reaching the expiration time.

3. The method of claim 1, further comprising:
   identifying a successful authentication for the new authentication request using the second image template; and
   extending the expiration time of the timer in response to the successful authentication for the new authentication request.

4. The method of claim 1, wherein generating the second image template using the captured image comprises:
   determining a value of the quality metric for the captured image;
   generating the second image template using the captured image in response to determine that the value of the quality metric exceeds a threshold value.

5. The method of claim 1, further comprising:
   in response to generating the second image template, associating a location with the second image template, the location identified using a geographical location of a computing device through which the user authenticated for the successful authentication attempt;
   subsequent to the generating the second image template, identifying an updated location of the computing device;
   deleting the second image template in response to a determination that the updated location exceeds a predetermined distance to the location associated with the second image template.

6. The method of claim 1, wherein the first image template and the second image template are facial templates representing a face of the user.

7. The method of claim 1, wherein using the second image template to authenticate the user comprises one or more of histogram matching, template matching, or feature matching between the captured image and the second image template.

8. The method of claim 1, wherein the expiration time is indicative of a predicted time that the user will be located in a current environment, and wherein the second image template was established for the current environment.

9. The method of claim 1, further comprising:
   receiving a second new authentication request subsequent to the timer reaching the expiration time;
   in response to identifying that the second new authentication request occurred subsequent to the timer reaching the expiration time, using the first image template to authenticate the user.

10. A system for authenticating users using image recognition in noisy environments, the system comprising:
    one or more hardware processors; and
    one or more memories, storing instructions, which when executed, cause the one or more hardware processors to perform operations comprising:
    identifying a failed authentication attempt for a user, the failed authentication attempt identified in response to a comparison between a captured image of the user and a first image template;
    identifying a successful authentication attempt for the user, the successful authentication attempt occurring subsequent to the failed authentication attempt and using a credential of the user;
    in response to the successful authentication attempt, generating a second image template different than the first image template using the captured image, wherein the second image template is generated in response to identifying that the captured image meets a quality metric indicative of environmental conditions different than environment conditions for an image of the user obtained to generate the first image template;
    in response to generating the second image template, establishing an expiration time of a timer;
    subsequent to establishing the expiration time of the timer and prior to the timer reaching the expiration time, receiving a new authentication request for the user; and
    in response to identifying that the new authentication request occurred prior to the timer reaching the expiration time, using the second image template to authenticate the user.

11. The system of claim 10, the operations further comprising:
    identifying that the timer has reached the expiration time; and
    deleting the second image template in response to the timer reaching the expiration time.

12. The system of claim 10, the operations further comprising:
    identifying a successful authentication for the new authentication request using the second image template; and extending the expiration time of the timer in response to the successful authentication for the new authentication request.

13. The system of claim 10, wherein generating the second image template using the captured image comprises:
   determining a value of the quality metric for the captured image;
   generating the second image template using the captured image in response to determine that the value of the quality metric exceeds a threshold value.

14. The system of claim 10, the operations further comprising:
   in response to generating the second image template, associating a location with the second image template, the location identified using a geographical location of a computing device through which the user authenticated for the successful authentication attempt;
   subsequent to the generating the second image template, identifying an updated location of the computing device;
   deleting the second image template in response to a determination that the updated location exceeds a predetermined distance to the location associated with the second image template.

15. The system of claim 1, wherein the first image template and the second image template are facial templates representing a face of the user.

16. The system of claim 1, wherein using the second image template to authenticate the user comprises one or more of histogram matching, template matching, or feature matching between the captured image and the second image template.

17. The system of claim 1, wherein the expiration time is indicative of a predicted time that the user will be located in a current environment, and wherein the second image template was established for the current environment.

18. The system of claim 1, the operations further comprising:
   receiving a second new authentication request subsequent to the timer reaching the expiration time;
   in response to identifying that the second new authentication request occurred subsequent to the timer reaching the expiration time, using the first image template to authenticate the user.

19. A system for authenticating users using image recognition in noisy environments, the system comprising:
   means for identifying a failed authentication attempt for a user, the failed authentication attempt identified in response to a comparison between a captured image of the user and a first image template;
   means for identifying a successful authentication attempt for the user, the successful authentication attempt occurring subsequent to the failed authentication attempt and using a credential of the user;
   means for generating a second image template different than the first image template using the captured image in response to the successful authentication attempt, wherein the second image template is generated in response to identifying that the captured image meets a quality metric indicative of environmental conditions different than environment conditions for an image of the user obtained to generate the first image template;
   means for establishing an expiration time of a timer in response to generating the second image template;
   means for receiving a new authentication request for the user subsequent to establishing the expiration time of the timer and prior to the timer reaching the expiration time; and
   means for using the second image template to authenticate the user in response to identifying that the new authentication request occurred prior to the timer reaching the expiration time.

20. The system of claim 19, further comprising:
   means for receiving a second new authentication request subsequent to the timer reaching the expiration time;
   means for using the first image template to authenticate the user in response to identifying that the second new authentication request occurred subsequent to the timer reaching the expiration time.

* * * * *